(12) United States Patent
Beauchamp

(10) Patent No.: US 9,866,961 B2
(45) Date of Patent: Jan. 9, 2018

(54) MULTI-CHANNEL LOUDSPEAKER ENCLOSURE WITH LATERALLY PROJECTING WINGS AND METHOD FOR ORIENTING AND DRIVING MULTIPLE LOUDSPEAKERS

(71) Applicant: Todd Beauchamp, Los Gatos, CA (US)

(72) Inventor: Todd Beauchamp, Los Gatos, CA (US)

( * ) Notice: Subject to any disclaimer, the term of this patent is extended or adjusted under 35 U.S.C. 154(b) by 0 days.

(21) Appl. No.: 15/134,218

(22) Filed: Apr. 20, 2016

(65) Prior Publication Data

US 2016/0234599 A1 Aug. 11, 2016

Related U.S. Application Data

(63) Continuation-in-part of application No. 11/325,485, filed on Jan. 5, 2006.

(60) Provisional application No. 60/632,187, filed on Dec. 1, 2004.

(51) Int. Cl.
| | |
|---|---|
| *H04R 5/02* | (2006.01) |
| *G06F 3/16* | (2006.01) |
| *H04R 1/34* | (2006.01) |
| *H04R 1/26* | (2006.01) |
| *H04S 3/00* | (2006.01) |

(52) U.S. Cl.
CPC .............. *H04R 5/02* (2013.01); *G06F 3/162* (2013.01); *H04R 1/345* (2013.01); *H04R 1/26* (2013.01); *H04R 2420/09* (2013.01); *H04R 2499/15* (2013.01); *H04S 3/00* (2013.01)

(58) Field of Classification Search
CPC ...................................................... H04R 5/02
See application file for complete search history.

(56) References Cited

U.S. PATENT DOCUMENTS

| | | | | |
|---|---|---|---|---|
| 6,672,465 B2* | 1/2004 | White | ................... | A47B 81/06 108/106 |
| 7,280,667 B2* | 10/2007 | Furuno | ................... | H04R 5/02 348/E5.13 |
| 2004/0222721 A1* | 11/2004 | Kelley | ................... | A47B 81/06 312/205 |
| 2006/0096507 A1* | 5/2006 | Smith | ................... | A47B 81/06 108/50.02 |

(Continued)

*Primary Examiner* — Olisa Anwah
(74) *Attorney, Agent, or Firm* — McKinney & Associates, LLC.; J. Andrew McKinney, Jr.

(57) ABSTRACT

A multi-channel loudspeaker enclosure and display support stand incorporates left speaker system and right speaker system integrally in a winged center channel enclosure 16. The multi-channel "winged" loudspeaker system enclosure includes a plurality of loudspeaker drivers mounted within baffles defining a plurality of compartments or sub-enclosures. The loudspeaker system enclosure has "wings" projecting laterally from a central pedestal support. The wings define bottom surfaces which provide a virtually invisible location for down-firing left and right side mid-bass drivers 601, 620, 640 (see, e.g., FIG. 12). In the multi-channel "winged" loudspeaker system of the present invention, the center channel speaker units, left channel speaker units and right channel speaker units each include one or more speaker drivers configured and driven to provide superior acoustic summation with the down-firing midbass drivers and with an optional subwoofer placed in a separate enclosure configured as a pedestal support.

20 Claims, 23 Drawing Sheets

(56) References Cited

U.S. PATENT DOCUMENTS

| | | | | |
|---|---|---|---|---|
| 2006/0284031 | A1* | 12/2006 | Whalen | A47B 81/061 248/125.8 |
| 2009/0141894 | A1* | 6/2009 | Sahdra | H04N 21/4104 380/239 |
| 2009/0235509 | A1* | 9/2009 | Beger | A47B 87/0215 29/428 |
| 2009/0294605 | A1* | 12/2009 | Smith | A47B 81/06 248/158 |
| 2010/0050909 | A1* | 3/2010 | Obiorah | A47B 83/04 108/50.11 |
| 2012/0145654 | A1* | 6/2012 | McGowan | A47B 81/06 211/26 |
| 2012/0284751 | A1* | 11/2012 | Kim | H04N 5/76 725/41 |
| 2015/0077646 | A1* | 3/2015 | Chen | G06F 3/0418 349/12 |
| 2015/0212248 | A1* | 7/2015 | Yamamoto | H04R 1/028 381/150 |

* cited by examiner

MULTI-CHANNEL LOUDSPEAKER ENCLOSURE WITH LATERALLY PROJECTING WINGS AND METHOD FOR ORIENTING AND DRIVING MULTIPLE LOUDSPEAKERS

This application is a continuation-in-part of and claims priority to (a) commonly owned provisional patent application No. 60/642,187 filed Jan. 6, 2005 and to (b) commonly owned utility patent application Ser. No. 11/325,485, entitled INTEGRATED ENTERTAINMENT SYSTEM WITH AUDIO MODULES filed Jan. 5, 2006, the entire disclosures of which are each incorporated herein by reference.

BACKGROUND OF THE INVENTION

Field of the Invention

The present invention relates to audio and video home entertainment equipment typically configured for use in the home.

Discussion of the Prior Art

Many home entertainment enthusiasts have configured audio and video playback systems including several components stacked on or under shelves, stands, carts, cabinets or tables, and these components are usually connected to one another with many signal cables and power cords. A system configured in this way typically includes components for receiving, detecting and demodulating audio and video signals, players for playing various forms of media, video displays and audio amplifiers, processors and two or more speakers. In most conventional systems, components such as an AM/FM radio tuner, digital video disc (DVD) player/recorder, satellite/cable television box, a digital media server and other audio playback components are provided as separate modules, each on its own chassis and in its own enclosure.

The many possible combinations of connections and settings for each component have lead to significant confusion. Polk Audio, Bose and others have answered by integrating DVD players and amplifiers with speakers into a type of system known generically as the "home theater in a box." But even these integrated systems have disadvantages.

A home entertainment system, generally speaking, is able to read media and to process and amplify signals and to provide audiovisual outputs. A home entertainment system need not be located in a home. A home entertainment system may be part of a home theater. One definition of a home theater is a home entertainment system that provides an experience similar to viewing in a cinema, namely brilliant, sharp, large video images with enveloping surround sound. A home theater system generally comprises a screen display, a surround sound system and a source or sources for movie content (e.g., a DVD player) along with audio speakers and visual displays. For purposes of the present description, the terms "home entertainment system" and "home theater" are synonymous.

In one popular configuration of home entertainment system, a television set or other video monitor is featured as a center-piece. In this configuration, the television set is supported on a stand. The stand further comprises shelves, usually below the surface that supports the television set. Alternatively, a home entertainment system may comprise a home entertainment unit rather than a stand. A typical home entertainment unit is a piece of furniture comprising a rectangular enclosure in which shelves are mounted. The various components are supported on the shelves. A typical system may also comprise a radio tuner, television set or television tuner and monitor, audio amplifier, audio preamplifier or "surround sound" unit, a video disc player, and speakers including one or more subwoofers (low frequencies), midbass drivers (mid bass frequencies), midrange drivers (mid frequencies), and tweeters (high frequencies) which are optionally included in a center channel, left front channel, right front channel, and two or more surround or rear channel speaker units. An example of such a television stand is illustrated in U.S. Pat. No. 5,216,211. It is noted that the terms high, mid and low frequency are relative, and do not necessarily specify a particular range of frequencies. Audio environments utilize a number of speakers which interact. Generally there are left, center, right, left rear, right rear and subwoofer speakers. Newer arrangements comprising additional speakers are coming into use.

In prior systems, the electronics modules and the subwoofer units have not been integrated. One disincentive for such integration is the mechanically deleterious effects on electronics modules of vibrations and heat generated when a subwoofer is energized.

Another shortcoming of the prior art is in the placement of the center channel loudspeaker. The center channel is a loudspeaker system that may comprise of a plurality of drivers reproducing a center frequency range, also referred to as the center channel. The center channel frequency range sent by a surround sound processor is the range in which voices and most musical tones fall. Different manufacturers specify different frequency ranges for the center channel. However, one nominal center channel range is 100 Hz-20 KHz. Center channel speaker units have not been adequately integrated into stands and home entertainment units. They may be supported on a stand.

U.S. Pat. No. 6,672,465 discloses a television stand having an upper surface to support a television set and a lower shelf that can support entertainment modules. A shelf intermediate the lower shelf and the upper surface supports and magnetically shields a center channel speaker unit. This construction requires that one shelf be dedicated to the center channel speaker unit. The illustrated center channel speaker unit is constrained to have a width less than that of the shelf. Size constraints of the center channel also constrain the level of acoustical power that can be supplied from the center channel. To produce desired sound levels, center channel output must combine both in frequency and sound pressure level (SPL) with outputs from subwoofers. The smaller center channels may not be capable of delivering the same high SPL levels of the subwoofer. Therefore the power that the subwoofer is designed to provide must also be limited to stay at the lower SPL limits of the center channel. If the subwoofer is not limited and continues to be played louder than the center channel, the bass may become overbearing and sound unnatural. The total system performance either suffers by unnatural sound or limited maximum sound output depending on the system design.

Generally, it is difficult to obtain good performance from a small center channel speaker unit (as compared to a larger center channel speaker). "Wife Acceptance Factor" and other constraints tend to limit both the size of the center channel speaker unit and the number of modules that can be stored on the shelves of the television stand. One particular aspect of this shortcoming is that the SPL output of a small bass speaker in the center channel unit must be blended with the output of a subwoofer frequency and SPL. The subwoofer requires floor space in addition to that required by the stand. The small speaker's maximum sound pressure level (SPL) at a low frequency is lower than that of a larger speaker. The level of audio output applied to drive the small speaker must be limited so as not to overdrive the small speaker. The small speaker's limited audio output thus limits performance of the entire speaker array. In smaller designs of center channel speakers, another commonly encountered drawback is that sound must be transmitted from speaker drivers into cabinet walls of the stand, causing further audio degradation.

There is a need, therefore, for a better home theater audio system and support structure for integrating audio and home theater video components which overcomes these problems and provides a simple, attractive and convenient method and support for setting up and operating the multiple speaker channels in a home entertainment or home theater system.

SUMMARY OF THE INVENTION

In accordance with the present invention, a simple, attractive and convenient method and support for setting up and operating the multiple speaker channels in a home entertainment or home theater system which provides a plurality of modular configurations, each integrated in a single enclosure.

The multi-channel "winged" loudspeaker system enclosure resembles a TV stand but includes a plurality of loudspeaker drivers mounted within baffles defining a plurality of acoustically separate compartments or sub-enclosures. The main loudspeaker system enclosure is configured with an upper support surface defining a substantially rectangular platform with an overall width of 36 to 60 inches, having laterally projecting "wings" from a central pedestal support. The winged enclosure has a front to back depth of preferably 14-20 inches and a depth of preferably 3 to 8 inches to provide external wall surfaces or baffles receive, aim and support for integral "left" and "right" loudspeaker systems (or channels), and the bottom surfaces of the wings provide a virtually invisible location for down-firing left and right side mid-bass drivers. In the multi-channel "winged" loudspeaker system of the present invention, the center channel speaker units, left channel speaker units and right channel speaker units each include one or more speaker drivers configured and driven to provide superior acoustic summation with the down-firing mid-bass drivers and with an optional subwoofer placed in a separate enclosure configured as a pedestal support. The optimum center channel placement provides superior sound imaging for a TV display supported on the winged enclosure's upper surface. The winged enclosure multi-channel speaker unit may also be provided as a stand-alone unit.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

DETAILED DESCRIPTION OF PREFERRED EMBODIMENTS

Figure 1:
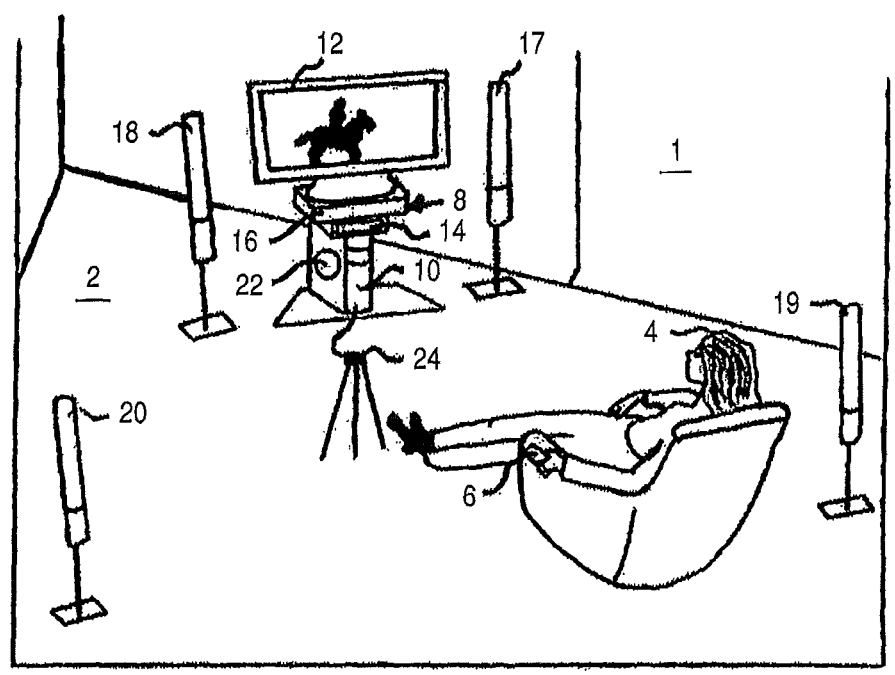
FIG. 1 illustrates a perspective view of a support structure for integrating audio and video components in an operating environment, in accordance with applicant's prior application Ser. No. 11/325,485, entitled INTEGRATED ENTERTAINMENT SYSTEM WITH AUDIO MODULES, which is incorporated into the present application, as noted above.

Referring to illustrative FIGS. 1-26, a home entertainment environment 1 located in a room 2 is described in general with respect to FIG. 1. A user 4 may utilize a remote control unit 6 to control operation. The home entertainment environment 1 comprises the apparatus, which creates an entertainment experience for the user 4. The home entertainment environment 1 comprises a home entertainment system 10 and may comprise a video display 12. The video display 12 may be part of a television set including tuners and an amplifier. Alternatively, the video display 12 could comprise a video monitor. The home entertainment system 10 is housed in a modular base 8 or pedestal enclosure 30. The home entertainment system 10 comprises components which provide different functions and which are integrated. Particular modules in the home entertainment unit 10 are described in further detail with respect to FIGS. 5 and 6. At the present time, commonly provided components include a radio tuner, digital video disc (DVD) player/recorder, compact disc (CD) audio player/recorder, digital video recorder (DVR), amplifiers and other audio units. It is foreseeable that other forms of media players will supersede present forms. Audio units may comprise amplifiers; surround sound units and other components for processing audio signals. In accordance with embodiments of the present invention, modules are integrated within the home entertainment system 10.

Figure 11:
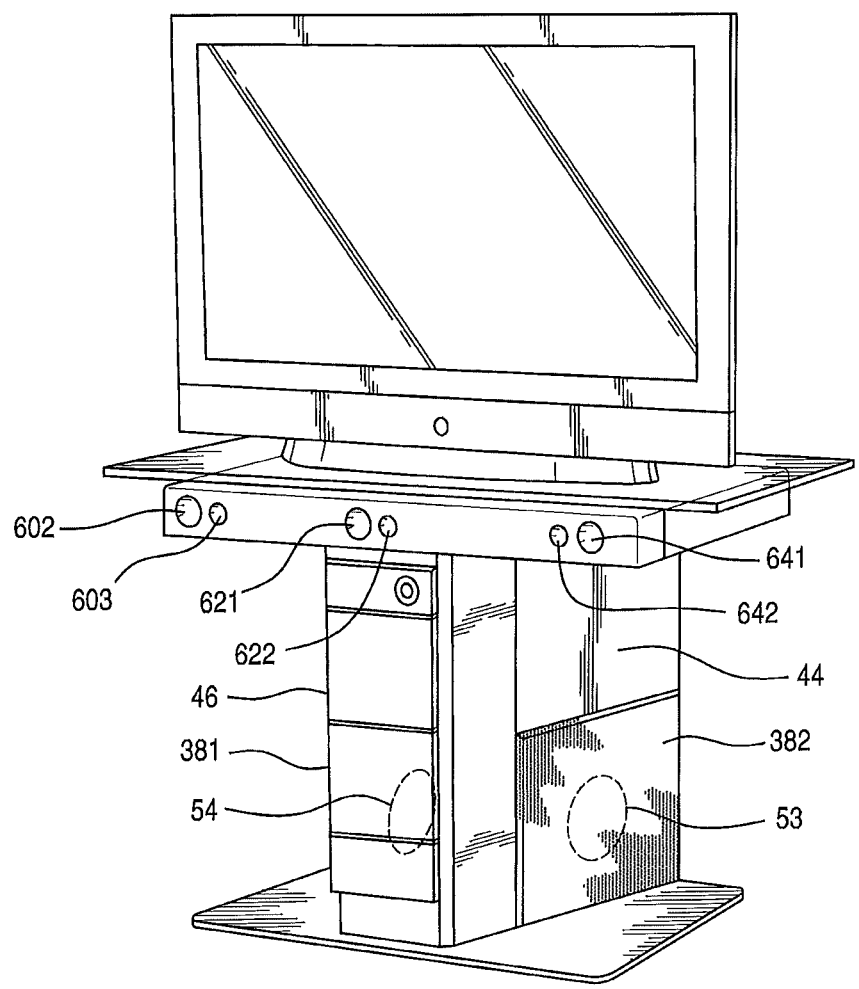
FIG. 11 illustrates another embodiment including a multi-channel "winged" loudspeaker system enclosure which resembles a TV stand but includes a plurality of loudspeaker drivers mounted within baffles defining a plurality of sub enclosures.
Figure 12:
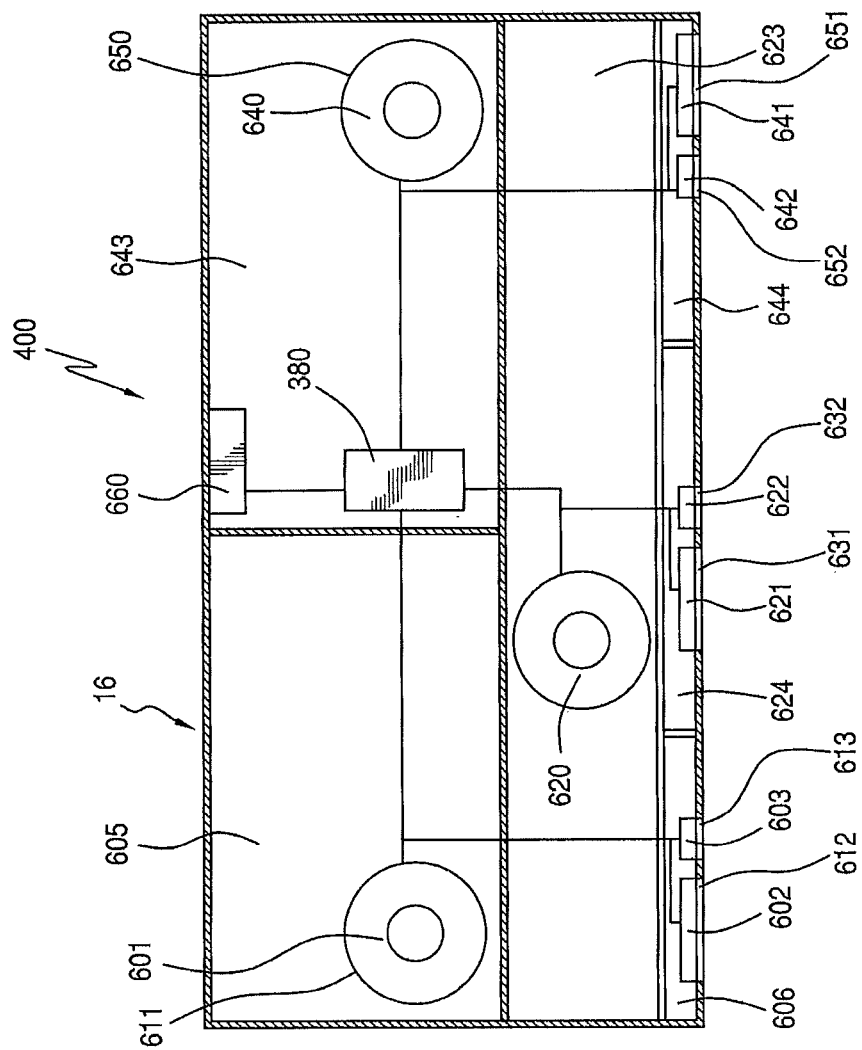
FIG. 12 is a diagram which illustrates the top or plan view of the winged multi-channel loudspeaker enclosure of FIG. 11 with integral left and right channel loudspeakers and visually hidden down firing mid-bass drivers, in accordance with the present invention.
Figure 13:
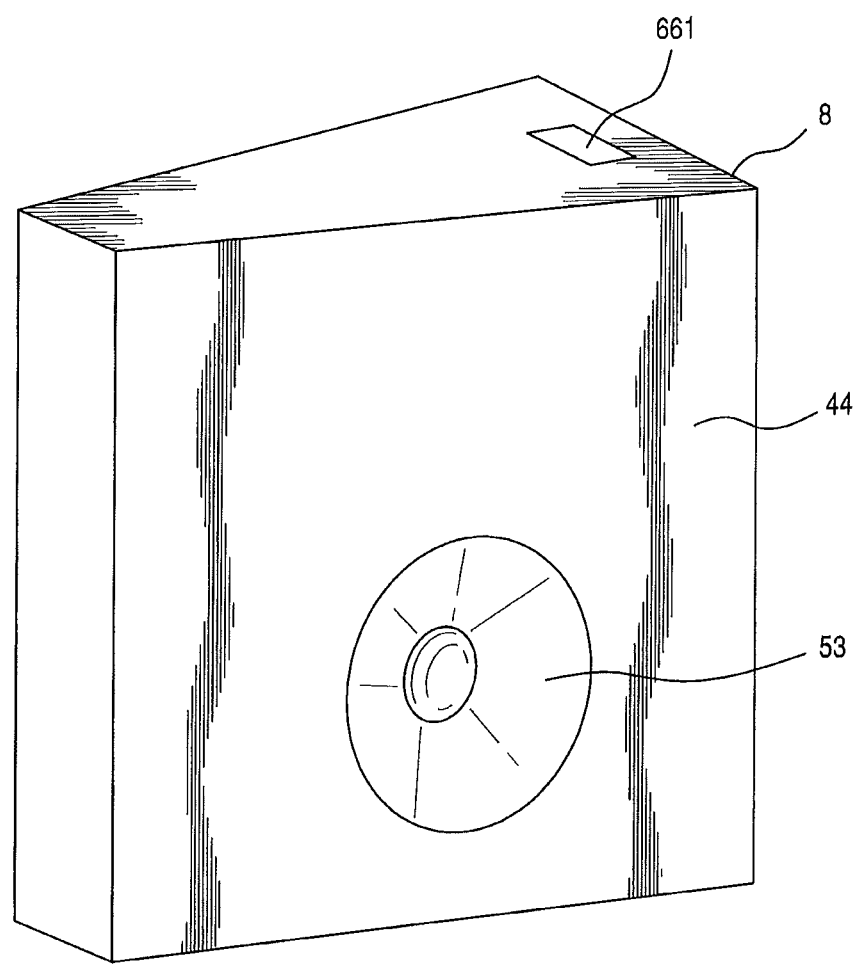
FIG. 13 is a diagram which illustrates the right side of the modular pedestal base of the winged multi-channel loudspeaker enclosure of FIG. 11, in accordance with the present invention

A preferred embodiment is illustrated in FIGS. 11-13, where multi-channel loudspeaker enclosure and display support stand incorporates left speaker (like 18 in FIG. 1) and right speaker (like 17 in FIG. 1) integrally in a winged center channel enclosure 16. The multi-channel "winged" loudspeaker system 400 includes a multi-compartment enclosure includes a plurality of loudspeaker drivers mounted within baffles defining a plurality of compartments or sub-enclosures. The loudspeaker system enclosure is advantageously configured as a thin, wide rectangular box with "wings" projecting laterally from a central pedestal support (8 or 30). The wings define left side and right side under-wing or bottom surfaces which provide a virtually invisible location for down-firing left and right side mid-bass drivers 601, 640 (see, e.g., FIG. 12) and preferably a center channel mid-bass driver 620 is mounted in front of the pedestal's front baffle. In the multi-channel "winged" loudspeaker system of the present invention, the center channel speaker units, left channel speaker units and right channel speaker units each include one or more speaker drivers configured and driven to provide superior acoustic summation with the down-firing midbass drivers and with an optional subwoofer placed in a separate enclosure configured as a pedestal support, as will be described in greater detail below.

Returning to FIGS. 1 and 2, subscriber interface unit 14 may be provided for connection to the home entertainment system 10. The subscriber interface unit 14 could comprise a cable box, satellite television tuner, video-on-demand box or other source of media. The subscriber interface unit 14 could be included in the home entertainment system 10. However, most homes utilize an interface unit provided by and belonging to a media provider. Therefore, subscriber interface unit 14 will generally, although not necessarily, be a component separate from the home entertainment system 10.

Audio is generally provided by a speaker array. Many different forms of speaker arrays may be provided. In one conventional array, a center channel 16 is provided in a location in horizontal registration with the home entertainment system 10. Prior systems may locate the center channel 16 on a shelf in the home theater 10 or on top of the video monitor 12, for example. Right and left speakers 17 and 18 are located on either side of the television monitor. First and second surround sound speakers 19 and 20 are located on either side of the video monitor 12 and displaced from the video monitor so as to be placed behind a user 4. In alternative systems coming into greater use, the speakers 19 and 20 need not be behind the user 4. A subwoofer 22 is usually located at or near floor level in the vicinity of the video monitor 12. Additionally, the home entertainment environment 1 may comprise a microphone 24 placed in a reference position in the room 2, for example, at a listening position in the room 2. The microphone 24 provides a feedback signal to an acoustic room correction feature in the home entertainment system 10. The acoustic room correction feature may adjust equalization of various speakers. Acoustic processing may include psychoacoustic processing. Psychoacoustic processing takes in to account differences in perceived sound from sound that is theoretically harmonious based on relationships of frequency components included in the sound.

Figure 2:
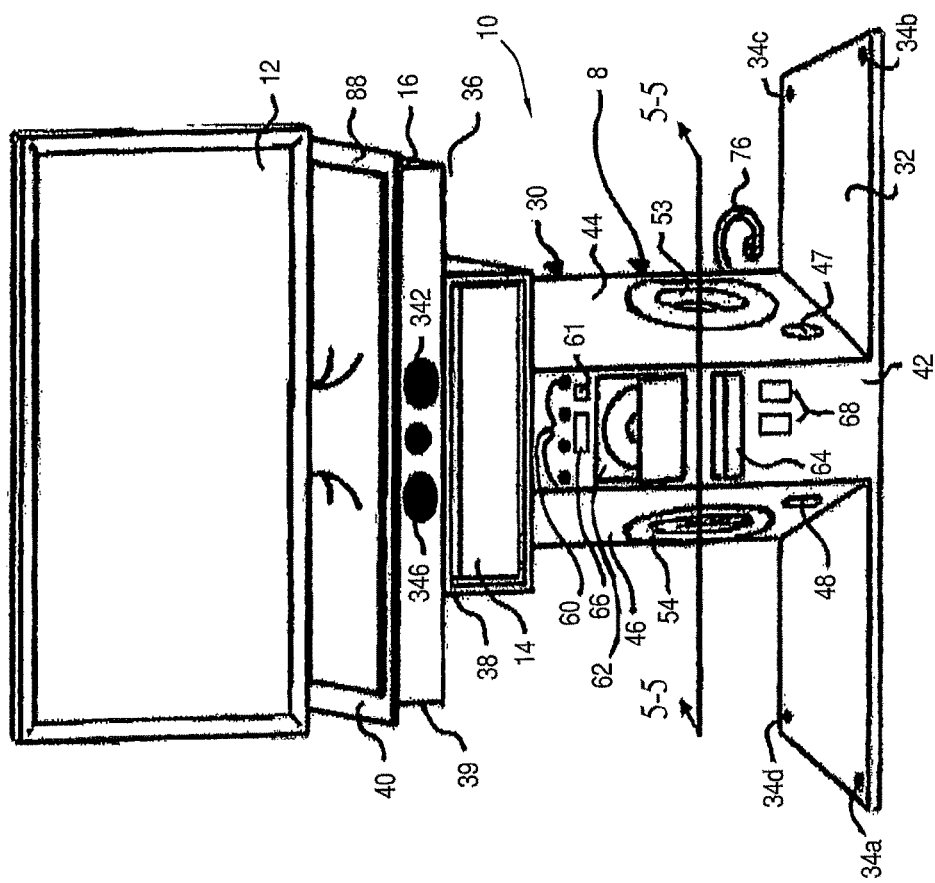
FIG. 2 is a front view in elevation of a similar embodiment, in accordance with the present invention.

FIG. 2 is a perspective front view of a home entertainment system 10, which is similar in shape but not identical to the embodiment of FIG. 1. The home entertainment system 10 comprises a first enclosure 30. The first enclosure 30 may be fastened to and supported on a base plate 32. The base plate 32 provides stability to prevent the first enclosure 30 from tipping over. Leveling adjusters 34a-34d may provide adjustment for each corner of the base plate 32 to provide for leveling the home entertainment system 10. In the present illustration, the base plate 32 is rectangular. In the illustration of FIG. 1, the base plate 32 is trapezoidal. Both functional and ornamental features may be included in the base plate 32. Alternatively, in the absence of a base plate 32, ballast may be provided at a bottom of the first enclosure 30 to create a low center of gravity to provide for stability. However, when a large video monitor 12 is to be supported at a top of the first enclosure 30, providing a sufficiently large weight of ballast may be impractical, and stability is provided by using a sufficiently wide base plate 32. Sufficient width is determined by the force moment about a center of the base plate 32 exerted by a center of gravity of the home entertainment system 10. First enclosure 30 width may be increased to provide adequate support for the video display 12 without the use of base plate 32.

Mounted above the first enclosure 30 is a housing unit 36. As further described below with respect to FIG. 4, the housing unit 36 may comprise a rectangular modular shelf unit 38 to support the subscriber interface unit 14 and may also have a closed portion 39 comprising the center channel 16 and may also comprise an upper support base 88. A support surface 40 is provided on which the video monitor 12 may be placed. The support surface 40 may comprise an upper surface of an upper support base 88 having a width greater than the housing unit 36 or may simply comprise a top of the housing unit 36. Taken together, the first enclosure 30 and the housing unit 36 comprise the modular base 8.

Figure 3:
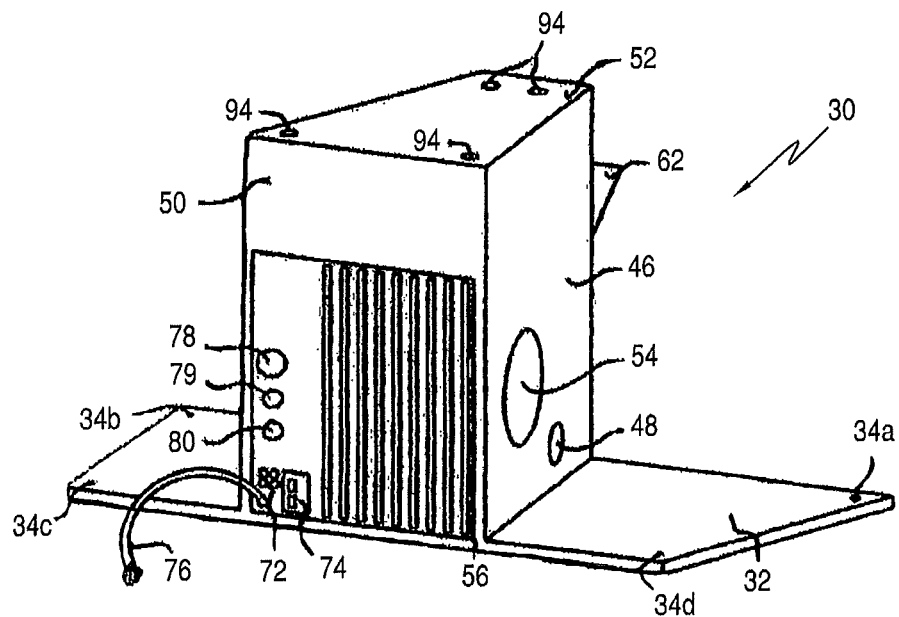
FIG. 3 is a rear view of another similar embodiment, in accordance with the present invention.

The first enclosure 30 is further described with respect to FIGS. 2 and 3. FIG. 3 is a rear perspective view of another form of the first enclosure 30 shown separately from the housing unit 36. The first enclosure 30 may have any of a number of shapes for its horizontal cross section. In the illustration of FIG. 2, the cross section comprises a trapezoid. In the illustrations, the first enclosure 30 comprises a front panel 42, a right panel 44, a left panel 46 and a rear panel 50. Terms such as front and rear are used to describe relative location. They do not indicate position with respect to a datum. In the present illustration, the positions are labeled to correspond to orientation as viewed by the user 4. The first enclosure 30 has a top surface 52. An electronics plate 56 may be located in an opening in the rear panel 50. The electronics plate 56 serves to support various components inside the first enclosure 30 and to allow access to various controls and other components from outside of the first enclosure 30, as further described below.

The first enclosure 30 may house first and second subwoofers 53 and 54 (FIG. 2) housed in side panels 44 and 46 respectively. By integrating the subwoofers 53 and 54 into the first enclosure 30, space that would be wasted in a traditional television stand is used to provide a subwoofer enclosure. The need for a second, bulky, separate unit is eliminated. Subwoofers are a source of low-frequency vibration that could potentially have a deleterious effect on components in the first enclosure 30. By mounting the subwoofers 53 and 54 substantially in spatial opposition, the vibrations produced will be opposite in direction and substantially in phase. Therefore, the vibrations transmitted from the subwoofers 53 and 54 to the first enclosure 30 substantially cancel each other. Acoustical ports 47 may be used to reduce pressure within first enclosure 30, thus further reducing vibration to surrounding components. Illustrated in (FIG. 2) acoustic ports 47 and 48 may be mounted on first enclosure 30 side walls 44 and 46. Said acoustical ports 47 and 48 may optionally be mounted to first enclosure 30 front 42 or back 50 walls (not shown).

Because the first enclosure 30 is designed to be both a stand as well as a speaker enclosure, the first enclosure 30 may be larger than prior art speakers but smaller than prior art home entertainment systems. If the first enclosure 30 were a stand-alone speaker unit, it would be regarded as unduly bulky. Commercial appeal of such a unit would be reduced. However, due to the number of functions provided, the first enclosure 30 will warrant greater consumer acceptance as it may be much smaller than traditional home entertainment systems. Since the first enclosure 30 acts as a soundboard, for a given size speaker, a smaller amplifier and smaller magnet driver can be used than would be necessary in the smaller sized enclosure normally associated with the given size speaker.

The front panel 42 (FIG. 2) provides portions of the home entertainment system 10 with which the user 4 may interact. These portions include a group of controls 60. The controls 60 may include on-off switches, component selectors, volume controls and other controls. The user 4 may operate the selected ones of the controls 60. Alternatively, the user 4 may operate the remote control unit 6 to perform selected tasks. A sensor 61 is mounted in the front panel 42 of the first enclosure 30 to receive signals from the remote control unit 6. The sensor 61 interfaces with a remote control circuit further described below. The sensor 61 is selected to be compatible with the remote control unit 6. For example, the sensor 61 may comprise an infrared sensor, and the remote control unit 6 may transmit pulses on an infrared carrier.

A number of components have portions mounted for access or display at the front panel 42. A disc player/recorder 62 includes a door which may be opened to receive one or more CDs or DVDs. The disc player/recorder 62 could comprise a disc changer which can hold a plurality of discs, playing a selected disc in response to a command. Alternatively, an optical media player/recorder other than a disc player may be used. A display 66 may take any of a number of forms. The display 66 may include fields to display information concerning the media being played, such as title and elapsed or remaining time on a track. The display 66 may be coupled to a radio tuner and display frequency and band to which a tuner is set. The display 66 may also include a text field for radio broadcast signals that provide text information. The display 66 may also include setup controls for the surround sound and room equalization.

If desired, other, separate components may be interfaced to the home entertainment system 10. The front panel 42, the rear panel 50 or both may comprise further input means to receive further media signals for processing by components in the home entertainment system 10. In the FIG. 2, a group of input ports 68 is provided on the front panel 42 to receive a variety of inputs. A currently preferred form of input port is a USB port. However, new standards continue to evolve, and another form of port may be provided. A digital media reader input and output (I/O) and audio/video (A/V) I/O 64 may be provided on the front panel 42 as well. As seen in FIG. 3, additional (I/O) sockets and jacks 72 are provided in the electronics plate 56. The additional input sockets and jacks 72 may be provided in accordance with any of a number of analog or digital protocols. The integrated disc recorder and/or DVR may record media from any one of the digital media or A/V inputs. Audio outputs 74 may be provided on the electronics plate 56 for interface to speakers. A subwoofer volume control 78 may also be mounted in the electronics plate 56. Subwoofer crossover adjustment 79 and phase adjustment 80 may be mounted to electronics plate 56. Additionally, a line cord 76 communicates through the electronics plate 56 to supply AC power to the home entertainment system 10.

Figure 4:
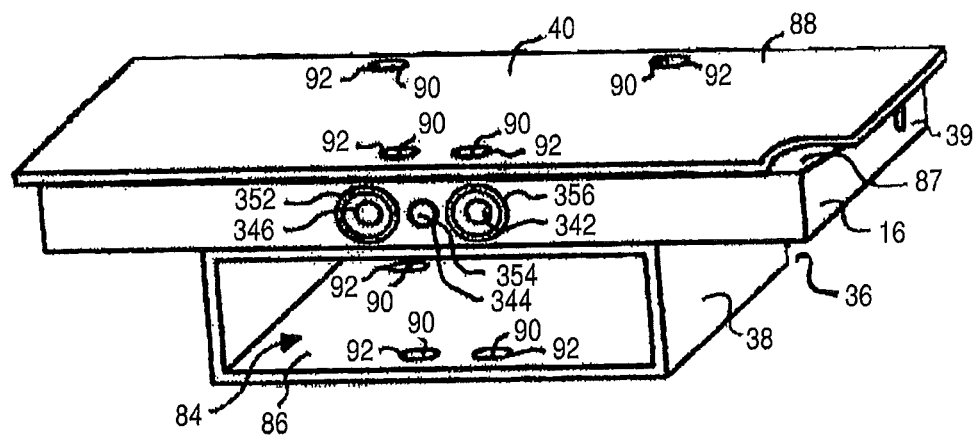
FIG. 4 is a partial detailed view illustrating one form of the modular shelf and center channel loudspeaker enclosure, in accordance with the present invention.

FIG. 4 is an axonometric view of the housing unit 36. As mentioned above, the center channel 16 is housed in the center channel enclosure 39. The center channel enclosure 39 is supported on the first enclosure 30. The center channel enclosure 39 may either be modular or unitary with the first enclosure 30. The upper support base 88 spans a top of the center channel enclosure 39. The modular shelf unit 38 comprises an open box 84 having an inner support surface 86 on which the subscriber interface unit 14 (not shown in FIG. 4) or other apparatus may be placed. The center channel enclosure 39 has an upper support surface 87. It is generally desirable to have the center channel enclosure 39 situated above the modular shelf unit 38 so that the source of sound is closest to the video display 12. If desired, the modular shelf unit 38 could be over rather than under the center channel enclosure 39.

In the illustration of FIG. 4, the upper stabilizing base 88 extending horizontally past either side of the housing unit 36. The upper stabilizing base 88 is fastened to the housing unit 36. Many different forms of fasteners could be used. In the present illustration, screws 90 extend through apertures 92 and are each received in a threaded aperture 94 (FIG. 3). The modular shelf 38 may be removable by apertures 92 each in registration with a threaded aperture 94 adjacent a corner of an upper surface of the housing unit 36. Similarly, apertures 92 are provided in the surface 86 of the modular shelf unit 38 each in registration with a location with a threaded aperture 94 adjacent a corner of an upper surface of the center channel enclosure 39. The upper stabilizing base 88 may be removable in order to allow substitution of alternate upper stabilizing bases 88 to accommodate a wide range of television bases. Alternatively, a smaller television may be supported directly on the upper support surface 87.

The structure of the present embodiment permits the center channel enclosure 39 to be wider than the first enclosure 30. This larger horizontal dimension allows for use of larger speakers than many prior art center channel units in an enclosure, and provides a larger than normal enclosure volume. The midbass driver further described with respect to FIGS. 8 and 9 below may be mounted in portions of the center channel enclosure 39, which overhang the first enclosure 30. Acoustical obstruction by the first enclosure 30 or by the modular shelf 38 is avoided. This construction lends itself to match the "single speaker surround sound" format. The center channel enclosure 39 in the preferred form has a slim height and large width yielding a form, which is generally regarded as aesthetically pleasing.

Figure 5:
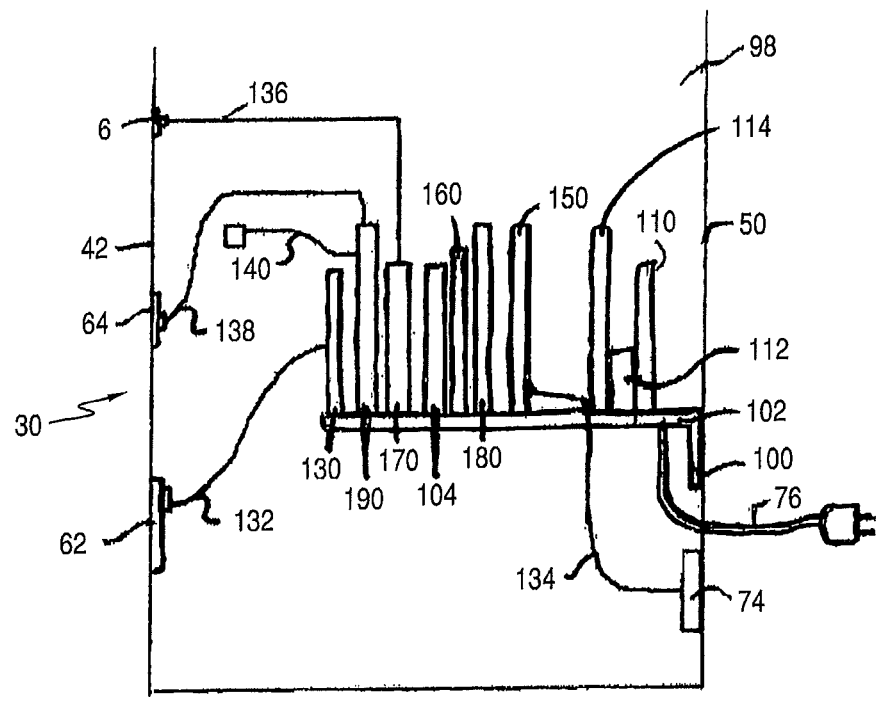
FIG. 5 is a cross sectional elevation taken along line 5-5 of FIG. 2.
Figure 6:
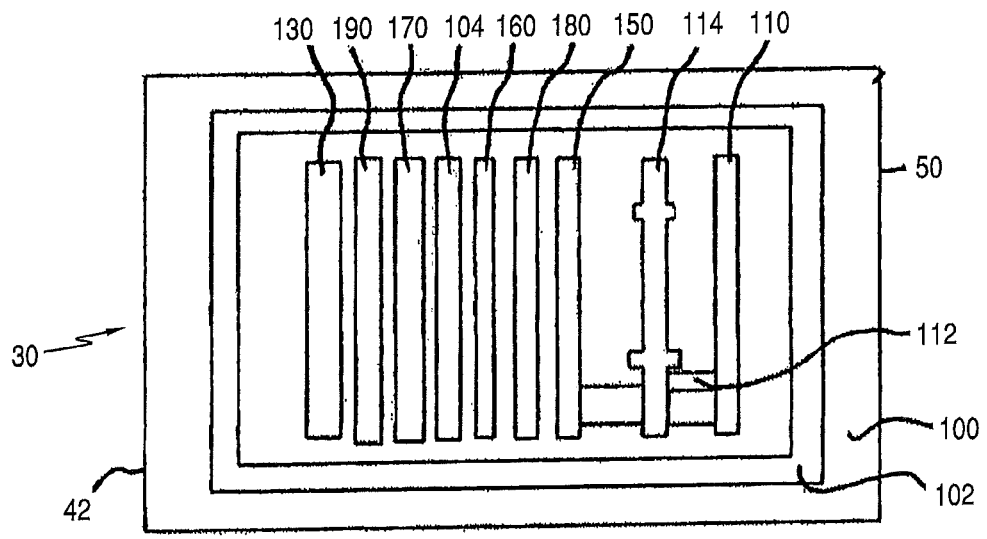
FIG. 6 is a plan view of the apparatus of FIG. 5.
Figure 7:
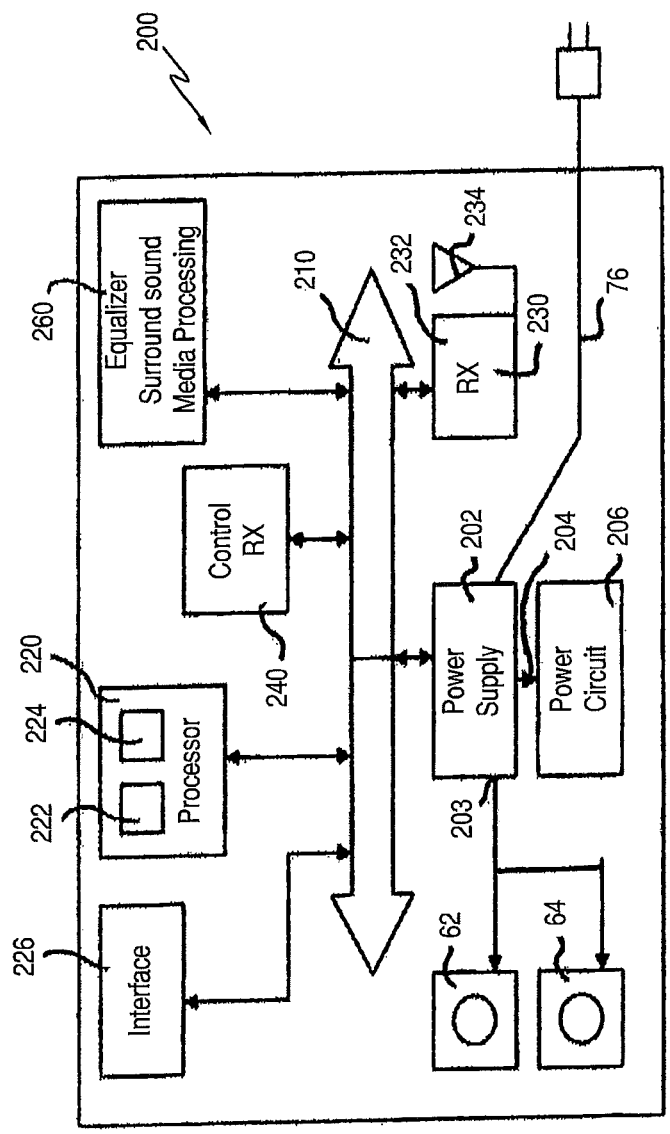
FIG. 7 is a block diagram of one form of the present invention.

The components of the home entertainment system 10 are illustrated in FIGS. 5 and 6. FIG. 5 is a cross sectional elevation taken along line 5-5 of FIG. 2 illustrating an interior 98 of the first enclosure 30. FIG. 6 is a plan view of the apparatus of FIG. 5. The plurality of modules may be embodied in many ways. A plurality of chassis, each comprising a different module could be provided inside the first enclosure 30. In another form, the modules may comprise separate circuit boards, each circuit board being associated with a particular function, integrated in a multifunction unit and connected to a common power supply. The modules may easily be upgraded or replaced in the event a unit fails. This prevents replacing the entire unit, instead only the component needing upgrade or repair. In a further embodiment, for example as illustrated in FIG. 7, one circuit board may be associated with a plurality of modules. For example, a processor board could be provided to do signal processing for a plurality of modules. Processing capacity may be shared between boards such as a tuner and a surround sound unit rather than providing a separate processor on each board.

As seen in FIGS. 5 and 6, a bracket 100 is fixed to the inner surface of the electronics plate 56 and supports a card cage 102. The card cage 102 supports selected circuit boards which together provide the functions of various modules and which provide interfaces to media source inputs and audio outputs. The functions assigned to various boards in the present illustration are representative of the different forms that may be provided. Components performing a particular function may be distributed over a plurality of boards. It is also possible to centralize a performance of function on a single board serving each module. In the present illustration, a power supply card 110 is supported in the card cage 102 and connected to the line cord 76. The power supply card 110 comprises power-conditioning circuitry 112.

The power conditioning circuitry 112 generates heat. Heat exchange apparatus 114 is mounted on the card 110 adjacent the power conditioning circuitry 112 to dissipate heat. Depending on power dissipation of the power supply 110 and an amplifier further described below, the heat exchange apparatus 114 may or may not include radiation fins. In selected embodiments, the heat exchange apparatus 114 may be thermally coupled to or comprise a portion of the electronics plate 56 (FIG. 3). Well-known forms of heat exchange apparatus may be used. The selection will be dependent on the heat sensitivity of modules to heat and the power level dissipated by the power-conditioning circuitry 112. In many applications, heat-radiating fins will be suitable. Other applications may utilize active cooling components such as fans or heat pipes. The power supply card 110 replaces the separate power supplies that would each be included in discrete modules.

The provision of a single power supply reduces component count, the number of connectors that must be provided and the volume occupied by power supply circuitry. Nominal module power supplies have efficiency levels of 30% to 60%. In one preferred form, the power supply 110 is a switching power supply. A nominal efficiency level for a switched power supply is 60% to 90%. A switched power supply is capable of converting differing input voltage levels.

A digital media reader card 64 may be connected through cable 138 to board 190 on the card cage 102. Digital media player/recorders may read many different forms of media, such as movies, photographs, audio and video camera outputs. A cable 132 may couple the disc drive 62 to the digital media reader card 130. Decoded sound signals are processed by a processor and sent to an amplifier card 150 for provision of audio signals to speakers. The amplifier card 150 may include preamplifiers or may receive an input from a preamplifier on another circuit board. In one embodiment, the amplifier card 150 is also mounted to make use of the heat exchange apparatus 114. The amplifier card 150 will comprise at least one amplification channel. Outputs from the amplifier card 150 are provided by a cable 134 to the audio speaker terminal bank 74. Other output interfaces could be provided. Further sound processing is provided by a surround sound processing card 160. The surround sound processing card 160 includes at least one surround sound decoder. In many applications, the number of amplifier channels in the amplifier card 150 will be a function of the surround sound decoder capabilities.

A receiver card 170 is coupled by a cable 136 to receive signals from the sensor 61 in response to inputs from the remote control unit 6 and converts inputs from the control unit 6 to control activation of selected modules and selected operating functions within modules. A tuner card 104 may be provided to tune to selected radio bands. Currently popular bands include FM, AM radio and satellite radio provided by such services as Sirius and XM radio. Further interconnections may be provided via an interface board 190. The interface board 190 may steer signals as appropriate between the other circuit cards and may be coupled to a group of cables 140 to interface all other inputs and outputs to the home entertainment system 10.

FIG. 7 is a block diagram of one form of integrated entertainment system. In FIG. 7, an integrated system 200 is illustrated on a single circuit board. The same reference numerals are used to denote components corresponding to those in FIGS. 1-3. The line cord 76 is connected to a power supply 202. The power supply 202 provides drive mechanism power from a terminal 203 to drive mechanisms such as the disc player/recorder 62. The power supply 202 also provides high-level power via connector 204 to components illustrated as a power circuit 206. Components drawing high levels of power include audio amplifier channels. Additionally, the power supply 202 provides power to integrated circuitry and processors in the integrated system 200. This provision of power is illustrated as a connection to a bus 210. Data and control signals are transmitted over signal-carrying portions of the bus 210. A central processing unit 220 coupled to the bus 210 comprises a data memory 222 and a program memory 224. The program memory 224 comprises programs for decoding digital signals representing audio and video signals. Alternatively, the functions performed could be depicted by illustrating a decoder for each form of signal to be processed. While the integrated system 200 will generally be used to process only one medium at a time, multiplexing capabilities may be provided to process more than one medium at a time. An interface circuit 226 is coupled between the media sources such as disc player/recorder 62 (FIG. 2) and the bus 210 in order to coordinate timing of signals to be processed and to match input impedances to the bus 210.

A tuner chip 230 comprises a coupler 232 which connects to an antenna 234. The antenna 234 may comprise an array of multiband antennas. The tuner chip 230 may include an FM, AM and satellite section. In the present embodiment, video tuning is done by a tuner in the television set 12 (FIG. 2). However, a separate video tuner could be provided in the integrated system 200. Additionally, a receiver chip 240 is provided to respond to control signals from the remote control unit 6. The processor 220 may interpret the control signals and direct selected signals accordingly. A media circuit 260 illustrates additional audio, video and other processing functions.

Figure 8:
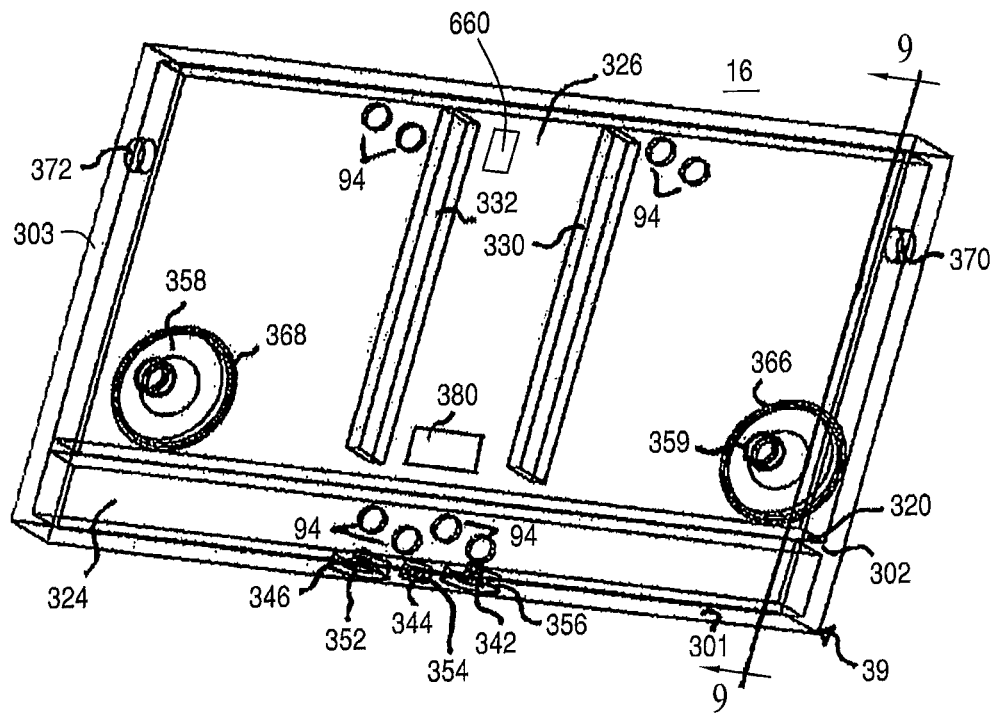
FIG. 8 is a perspective view of the internal structure for center channel speaker unit.
Figure 9:
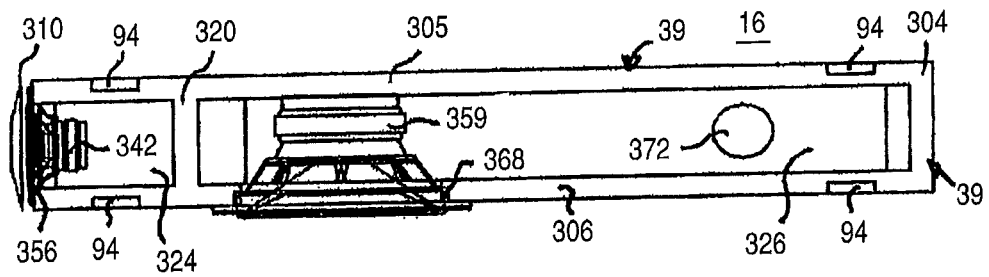
FIG. 9 is a cross sectional side elevation taken along line 9-9 of FIG. 8.

FIGS. 8 and 9 illustrate the center channel speaker unit 16 housed in the center channel enclosure 39. For purposes of illustration, the center channel enclosure 39 is shown as having transparent walls, for example of Lucite or Plexiglas. FIG. 8 is an axonometric view. FIG. 9 is a cross sectional side elevation taken along line 9-9 of FIG. 8. The center channel enclosure 39 has a front wall 301, right and left side walls 302 and 303, a rear wall 304 and upper and lower walls 305 and 306. The center channel enclosure 39 may conveniently be made of a number of different materials. Suitable plastics include polyvinyl chloride (PVC) and acrylonitrile butadiene styrene (ABS). Other suitable materials include extruded aluminum and wood. A speaker grille 310 (FIG. 9) may be mounted in front of the front wall 301. A midrange-midbass divider wall 320 parallel to the front wall 301 divides the center channel enclosure 39 into first and second chambers 324 and 326. In the chamber 326, first and second braces 330 and 332 are provided to support weight transmitted from apparatus supported above the center channel enclosure 39.

In the embodiment of FIGS. 8 and 9, the center channel speakers comprise a right mid range speaker 342, tweeter 344 and left mid range speaker 346 received in apertures 352, 354 and 356 respectively in the front wall 301. Preferably, the tweeter 344 is centered in the front wall 301, and the right mid range speaker 342 and left mid range speaker 346 are symmetrically spaced from the tweeter 344. Right and left midbass speakers 358 and 359 are supported to the lower wall 306. The speakers 358 and 359 project sound through apertures 366 and 368 respectively. The right and left midbass speakers 358 and 359 are preferably placed symmetrically and sufficiently close to the right and left walls 302 and 303 respectively so as to overhang the modular shelf 38 and the first enclosure 30. Consequently, sound is delivered into the air and is not muffled by enclosure walls. Midbass ports 370 and 372 in the right and left walls 302 and 303 respectively allow for air movement created by flexing of cones in the midbass speakers 358 and 359. A crossover circuit 380 distributes various drive signals to appropriate ones of the speakers 342, 344, 346 358 and 359.

The arrangement of FIGS. 8 and 9 is exemplary, but other numbers of speakers could be included. Speaker systems with additional speakers are gaining in popularity in use. Many different arrangements of modules may be provided in order to construct embodiments of the present invention. At a minimum, the home entertainment system 10 will comprise audio and video player/recorders and amplifiers.

Figure 10:
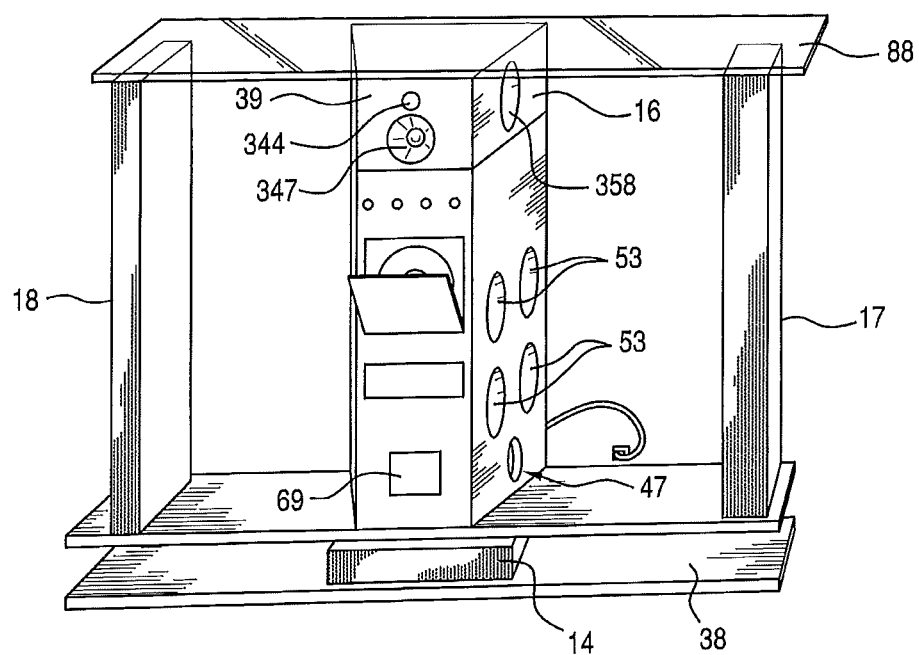
FIG. 10 is a front axonometric view of a similar embodiment including integrated center channel and multiple smaller subwoofers. The auxiliary shelf is moved to the bottom of the entertainment system; in accordance with another embodiment of the invention.

Another embodiment is illustrated in FIG. 10, wherein left channel loudspeaker 18 is configured with a tall and narrow enclosure forming a left side columnar support which opposes the symmetrically aligned right channel loudspeaker 17 which is also configured with a tall and narrow enclosure forming a right side columnar support, such that each provides a load bearing column to support the opposing laterally projecting left and right sides of upper support base 88. Enclosure 39 provides a central columnar support for upper base 88 and includes the center channel loudspeaker 16 with drivers including tweeter 344, midrange 347 and midbass 358. A plurality (e.g., four) right side woofers 53 are optionally included on the central columnar enclosure's right side and the front preferably includes a media server or media player docking station 69 and a DVD or CD drive. A user subscriber terminal or cable box is preferably also accessible from the front, preferably on modular shelf 38. There may also be one or more left side woofers (not shown) or a left side mid-base (not shown) and additional components or loudspeakers.

Returning now to FIGS. 11 and 12, enhanced home entertainment system 400 incorporates left channel speaker system (including drivers 602 and 603) and right channel speaker system (including drivers 641 and 642) integrally in a winged center channel enclosure 16. The multi-channel "winged" loudspeaker system enclosure 16 resembles a TV stand and, as seen in FIG. 11, can function as such, but includes a plurality of loudspeaker drivers mounted within baffles defining a plurality of sub-enclosures 606, 624, 644, 623, 605 and 643). The main loudspeaker system enclosure 16 is configured with an upper support surface defining a substantially continuous, rectangular, planar surface or platform with an overall width or lateral extent of, preferably 36 to 60 inches, having laterally projecting "wings" from central pedestal support (e.g., 8 or 30). The winged enclosure 16 has a front to back depth of preferably 14-20 inches and a height or thickness of preferably 3 to 8 inches to provide external wall surfaces or baffles which receive, aim and support for integral "left", "center" and "right" loudspeaker systems (driven by separate dedicated LCR amplification channels), and the bottom surfaces of the wings which project laterally beyond pedestal sides 44, 46 provide a virtually invisible location for down-firing left and right side mid-bass drivers 601, 640 (see, e.g., FIG. 12). In the multi-channel "winged" loudspeaker system of the present invention, the center channel speaker units, left channel speaker units and right channel speaker units each include one or more speaker drivers configured and driven to provide superior acoustic summation with the down-firing midbass drivers and with an optional subwoofer placed in a separate enclosure configured as a pedestal support. The optimum center channel placement provides superior sound imaging for a TV display supported on the winged enclosure's upper surface. The winged enclosure multi-channel speaker unit may also be provided as a stand-alone unit.

Preferably, each channel's loudspeakers are acoustically isolated from one another and are provided with a sub-enclosure volume or compartment of a selected volume to provide for adequate acoustical loading for a sealed or ported sub-enclosure. Thus, as best seen in FIG. 12, the left midbass 601 is mounted to the center channel enclosure's lower wall 306 through midbass aperture 611 occupying left midbass enclosure volume or compartment 605. The center midbass 620 is mounted to the center channel lower wall 306 through the center midbass aperture 630 occupying center midbass volume 623. The right midbass 640 is mounted to the center channel lower wall 306 through the right midbass aperture 650 occupying right midbass volume 643. The left mid loudspeaker 602 is mounted to the center channel front wall 301 through the left mid aperture 612 occupying left mid volume 606. The center mid loudspeaker 621 is mounted to the center channel front wall 301 through center aperture 631 occupying center mid volume 624. The right mid 641 may be mounted to the center channel front wall 301 through right aperture 651 occupying right mid volume 644. The left tweeter 603 may be mounted to the center channel front wall 301 through the left tweeter aperture 613. The center tweeter 622 may be mounted to the center channel front wall through the center tweeter aperture 632. The right tweeter 642 may be mounted to the center channel front wall 301 through the right tweeter aperture 652. The left, center and right terminal 660 may connect to the internal amplifier card 150 through the LCR connection 660. The LCR may connect through an automatic connection system 661 to prevent external wire connections to the electronics plate 56 and LCR connection 660. The LCR connection 660 may be mounted to the center channel lower wall 306. The LCR auto connection 661 may be mounted in the base top panel 52 and connect internally to the amplifier card 150. The LCR auto connection 661 may be simplified to only include the center connection if the left and right are not integrated into the center channel enclosure. It may also be expanded if additional channels are added to the center channel enclosure 39. The LCR connection 660 may connect to the crossover 380 mounted inside the center channel enclosure 39.

Figure 14:
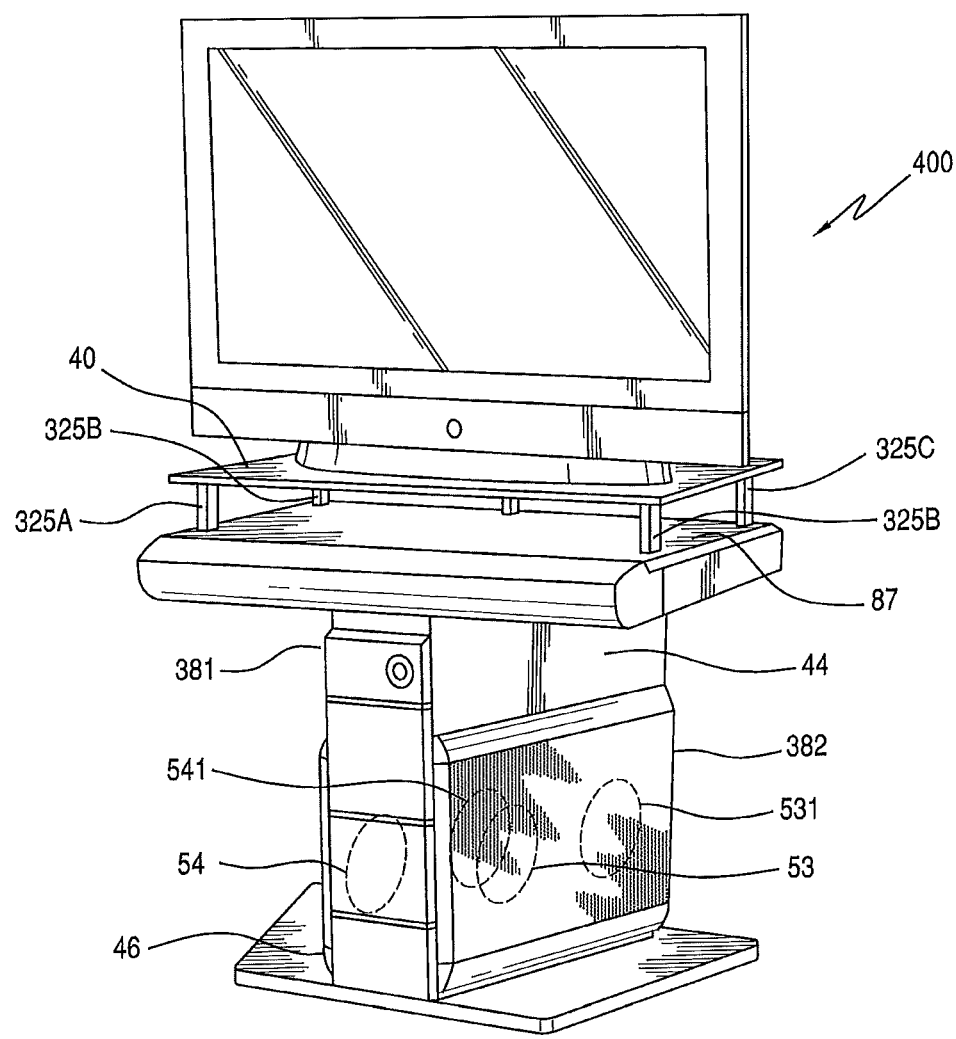
FIG. 14 illustrates another embodiment of the winged multi-channel loudspeaker enclosure, in accordance with the present invention

Referring now to FIG. 14, for a shallower stand enclosure, right side woofers 53 and 531 are mounted to right panel 44 and left woofers 54 and 541 are mounted to panel 46 and are smaller than a comparable single larger woofer. Multiple smaller woofers may allow for the Z dimension to be reduced without sacrificing low frequency output. The Xmax or speaker cone excursion and power handling may be optimized to produce the same or more acoustic output as a comparable single woofer loudspeaker.

Figure 15:
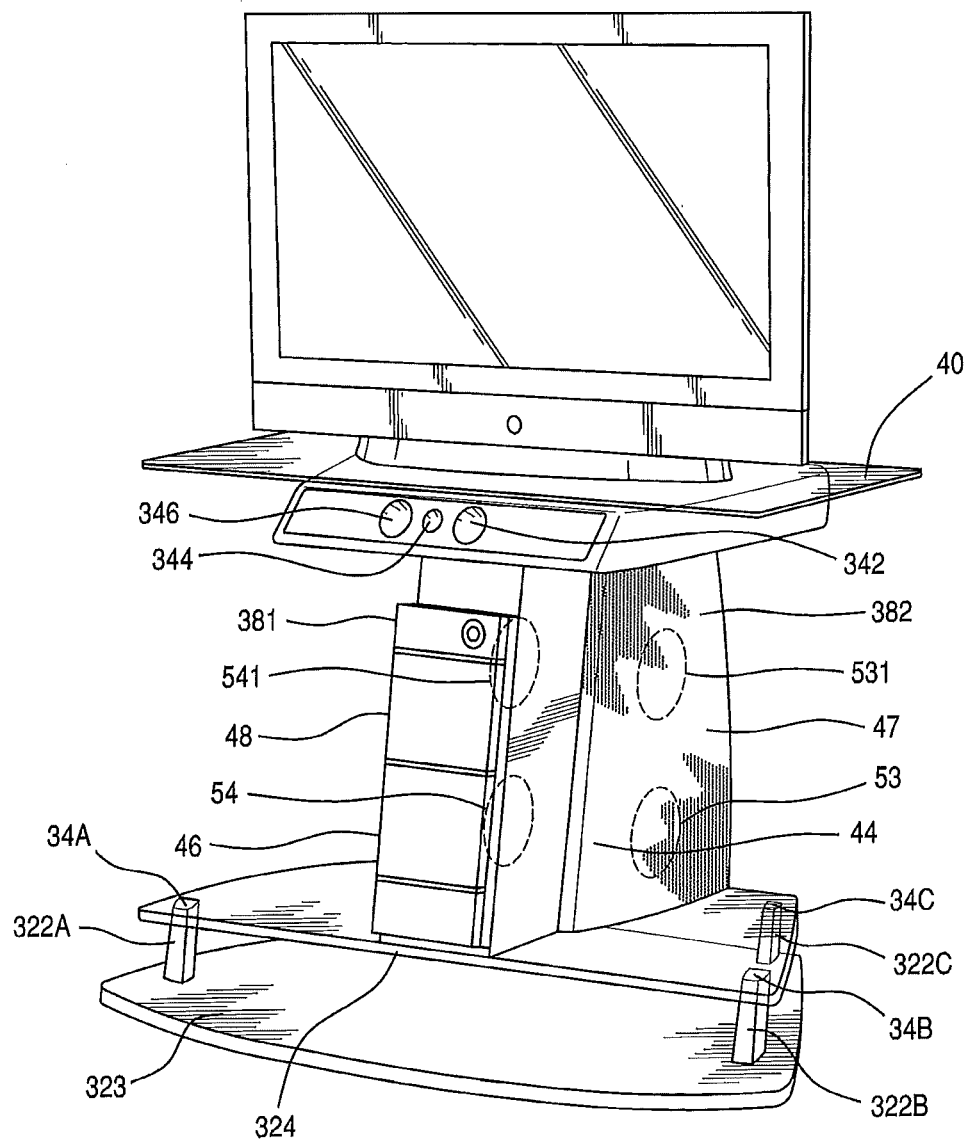
FIG. 15 illustrates another system and support structure for integrating audio and video components, in accordance with the present invention

Turning now to the embodiment of FIG. 15, a shallower stand enclosure is provided with right side woofers 53 and 531 mounted to right panel 44 and left side woofers 54 and 541 are mounted to left panel 46 and, here again, may be smaller in size when compared to a single larger woofer. The smaller woofers may allow for the Y dimension to be reduced without sacrificing low frequency output. The Xmax or speaker cone excursion and power handling may be optimized to produce the same or more acoustic output than a single woofer solution. To further improve low frequency acoustic output, tuned right port 47 may be mounted to right panel 44 and tuning left port 48 mounted to left panel 46.

Lower modular self supports 322A, 322B, 322C and 322D may be attached to the lower support base plate surface 324 and joined to lower modular self upper support surface 323 creating a space to place external devices such as cable box, VCR and game console. Multiple external devices may be connected simultaneously to many input/output (I/O) ports of the entertainment system 10.

Figure 16:
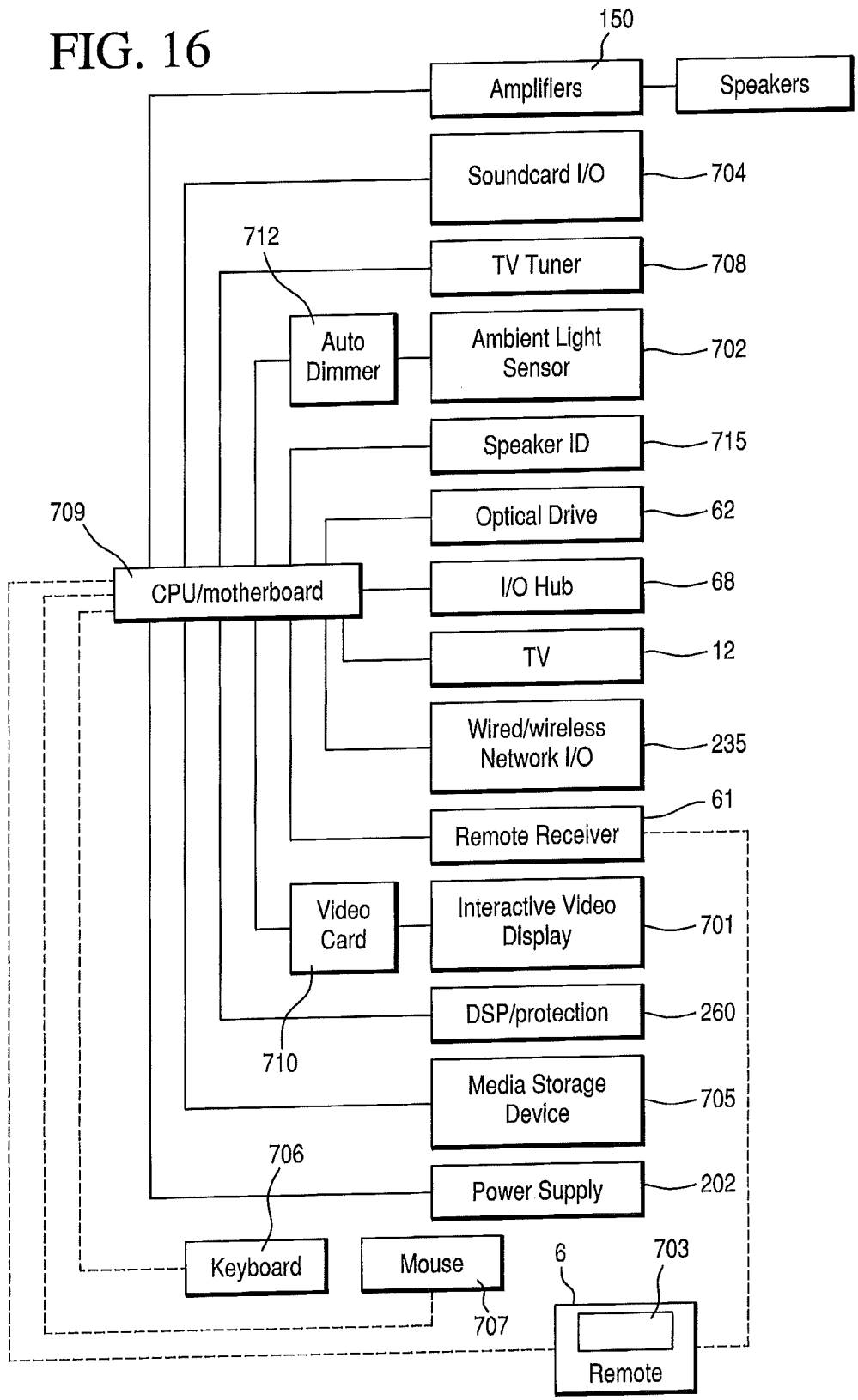
FIG. 16 is a schematic diagram illustrating the connections among integrated audio and video components, in accordance with one embodiment of the present invention
Figure 17:
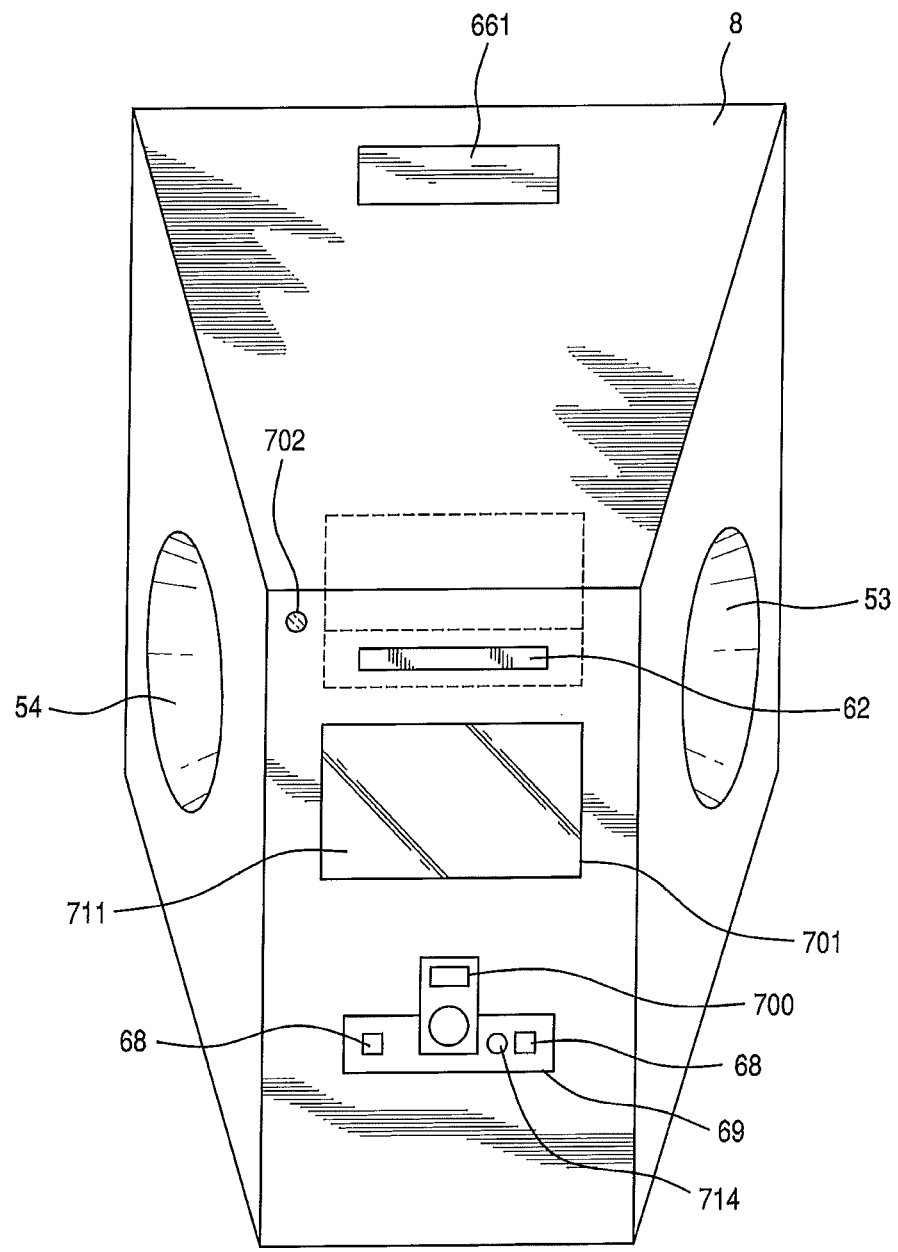
FIG. 17 illustrates another system and support structure for integrating audio and video components, in accordance with the present invention

Referring to FIGS. 16 and 17, the computer controlled integrated entertainment system is an all in one media center capable of downloading, sharing, editing and playback through the integrated speakers. Via a built in interactive touch screen display 701, wired or wireless mouse 707 and keyboard or mobile device (e.g., a smartphone) 706 one could navigate the software controls to operate the system. As a media center, media may be transferred via a plethora of protocols in both analog and digital domains. Both analog and digital content may be imported and exported but not limited to paths such as Bluetooth, Infrared, USB, Fire wire, network (wired or wireless), optical media and solid state cards. The entertainment system may be setup as a stand-alone system or a file sharing hub for multiple devices local or remote. The system may be the master controller or be controlled remotely.

The computer 709 provides a programmable backbone to the entertainment system, providing processing power to control the plethora of internal and external devices. The built in touch screen monitor 701 may offer easy navigation through system controls, media selection and data organization. There may be multiple monitors or display screens where specific tasks of the entertainment system could be displayed. A small display 701 may be built directly into the entertainment system that could be controlled via an independent video card 710 and mouse driver. This control display 701 may control all aspects of the system when the main display is not active. This would allow a user who wishes to listen only to music, select their content without turning on the main display or television. When the entertainment system is powered on for the first time, a welcome screen will appear on the control display. The welcome screen may include setup guides such as auto display dimmer, speaker selection, auto EQ, auto update, remote control, maximum display resolution. All setup features are accessible at any time after initial user setup. The control display 701 may be navigated via its' touch screen 711, or an external mouse 707 or keyboard or mobile device 706. The external keyboard or mobile device 706 and mouse 707 may be wired or wireless. The mouse function 711 of the control display 701 touch screen, keyboard/mobile device 706 and external mouse 707 may transition to additional displays or television. By controlling multiple displays the operator may multitask by watching a movie on one display, surf the internet on another, and arrange files on the other. Each display may be driven from an independent video card which could allow the operator to optimize the display resolution for each display. Custom software may allow the system to display specific programs and features to a specific display improving navigation efficiency.

A display auto dimmer 712 allows the user to set the dim level and time to dim on the control display 701. It is common in home theater environments 1 to dim light sources to minimize any distraction from the viewing source 12. It is desired to dim the control display 701 shortly after a selection is made to minimize the detractions from the main display 12. There may be an ambient light sensor 702 to auto detect the light in the room which may give further information for the auto level adjustment 712. In a bright room such as in the daylight, the control display 701 may be adjusted brighter than in the dark. A brighter control display 701 may allow for easier visibility and user selection during use.

Smart controlling software and hardware 713 may auto route the audio signal to the entertainment system 10 or television 12 depending on the operating mode. When using speakers external 16, 17, and 18 to the television 12, the TV speaker volume in commonly minimized to reduce interaction with the external speakers. Playing both television 12 and external speaker 16, 17, and 18 could drastically degrade the audio performance. The smart controls 713 could sense if the system is active and determine whether to route the audio internally or external to the TV 12. If the entertainment system 10 is turned on, it could auto switch the audio path and remote control 6 back to the entertainment system 10. If the entertainment system 10 is turned off, it could reroute the audio and remote control 6 back to the TV 12. The system could transmit a signal to the remote control 6 telling it to switch the path volume control from the entertainment system 10 or TV 12, whichever is selected. The entertainment system 10 could have the capability of remembering the volume control for each mode and recall when activated. User audio path routing setting may be setup during the initial system setup screen or any time afterward.

Being computer based (e.g., with CPU 709), the entertainment system 10 is perfect for multimedia interaction between external device such as camcorders, digital cameras, mp3 players, phones or PDA. Data could be imported or exported between the external device and the entertainment system 10. The external device may communicate to the main system through wired or wireless means such as Bluetooth, Infrared, USB, Fire wire, network (wired or wireless), optical media, HDMI, Infrared, serial, parallel, eSate, and solid state cards. If the attached device allows for it to be controlled remotely, the entertainment system 10 may be setup to share the device through it's plethora of I/O ports.

If the entertainment system 10 is connected to a wired or wireless internet connection 235, software updates may be downloaded and installed. These updates may include visual functions, database updates, and bug fixes. During initial setup, the user or operator may select to actuate a feature entitled "auto update" to execute or run a routine check and download updates automatically, or through a software setting check for updates manually. If the entertainment system 10 is not connected to the internet, the files may be downloaded to a remote computer and transferred to the entertainment system 10 through one of its I/O ports 64 or 68.

A headphone port 714 may be provided for a wired or wireless connection. When a multichannel source is being played through the entertainment system 10 to the two channel headphone port, hardware or software simulated surround sound algorithms may be decoded and implemented. In the solid state option, the algorithm may be programmed into the chip directly. With the software solution, the processing power of the CPU 220 may provide the decoding. Both methods may be updated through the software updating process.

The center channel 16 may connect through an automatic connection system 660 and 661. This connection system 660 and 661 would eliminate the need for external wires running from the amplifier plate to the center channel 16. If the center channel enclosure 16 is adapted to include the left and right channel loudspeakers, the left and right channels may be connected to the automatic connection 660 and 661. This would further simplify the setup by eliminating physical wire connections to the external speakers 16, 17, 18 and amplifier 150. The connector 660 may protrude from the bottom of the center channel enclosure 39 and mate with the corresponding connector 661 on the main housing 30 of the entertainment base 8. With the plethora of center channel configurations such as FIGS. 10, 11 and 15 corresponding custom DSP and equalizer settings may be needed to optimize the sound. A speaker identification protocol 715 may be implemented through the LCR connection 660 and 661 and detected through one or more pins. A resistor or controller detection may be part of the LCR connection system 660 and 661. When a speaker with a given ID is detected, a preset equalization, protection, and soundstage shaping setting may be loaded from memory to the audio path. The main base 8 may be common, while several center speaker 16 solutions could easily be connected to the system and optimized automatically. If new speakers solutions are released after the customers has purchased their system, new software settings may be downloaded or installed on the system.

The remote 6 for the entertainment system may be universal in design allowing for custom controls and communication codes to be programmed to operate external devices. A wide range of external devices could be programmed such-as TV, Satellite, cable box, Optical players. A TV on-screen device selection menu built into the main system 10 could provide the proper program codes for a given device. Once the code is selected it will automatically be transmitted to the remote and programmed. At any point, it a piece of equipment is replaced or updated the remote 6 programming screen may be accessed for new codes. The program codes may be updated over the internet if a connection is established through 235 or downloaded and transferred from another computer. The remote 6 may have a built in screen 703 which would allow the user to view audio/video content titles for easy selection. If the content on the main system 10 contains artwork such as album art or movie covers, the artwork preferably appears on the remote's screen 703. From the remote 6, mouse/remote or keyboard 706, the user may scroll through the media content. There may be a dedicated button on each of the controlling devices to prompt the main screen 12 to jump to a media selection window for easy content selection.

The computer controlled integrated entertainment system of the present invention is an all in one media center capable of downloading, sharing, editing and playback through the integrated speakers. Via a built in interactive touch screen display 701, wired or wireless mouse 707 and keyboard/mobile device 706 a user may navigate the software controls to operate the system. As a media center, media may be transferred via a plethora of protocols in both analog and digital domains. Both analog and digital content may be imported and exported via channels or paths such as Bluetooth, Infrared, USB, Fire wire, network (wired or wireless), optical media and solid state cards. The entertainment system may be setup as a standalone system or a file sharing hub for multiple devices local or remote. The system may be the master controller or be controlled remotely.

Turning now to the embodiments of FIGS. 18-26, it will be appreciated by those of skill in the art that a number of configurations can be advantageously employed. For any of the embodiments illustrated in FIGS. 18-26, a computer controlled integrated entertainment system (e.g., 400 or 500) comprises an all-in-one media center capable of downloading, sharing, editing and playback through the integrated speakers. A user navigates software controls via a built in touch screen display, wired or wireless mouse and keyboard/mobile device to operate the system. As a media center, media recordings or files may be transferred via a plethora of protocols in both analog and digital domains. Both analog and digital content may be imported and exported to the entertainment system by a wide variety of communication channels or paths such as Bluetooth signal transmission, Infrared signal transmission, USB signal transmission, Fire wire signal transmission, network data (wired or wireless) signal transmission, analog or digital (e.g., optical) media and solid state (e.g., SD) data storage cards. The entertainment system may be setup as a standalone system or as a file sharing hub for multiple devices local or remote. The system may be the master controller or be controlled remotely.

The computer preferably provides the backbone to the entertainment system and provides processing power to control the many internal and external devices. The built in touch screen monitor may offer easy navigation through system controls, media selection and data organization. There may be multiple monitors or display screens where specific tasks of the entertainment system could be displayed. A small display may be built directly into the entertainment system that could be controlled via an independent video card and mouse driver. This control display may control all aspects of the system when the main display is not active. This would allow a user who wishes to listen only to music, select their content without turning on the main display or television. When the entertainment system is powered on for the first time, a welcome screen will appear on the control display. The welcome screen may include setup guides such as auto display dimmer, speaker selection, auto EQ, auto update, remote control, maximum display resolution. All setup features are accessible at any time after initial user setup. The control display may be navigated via its' touch screen, or an external mouse and keyboard. The external keyboard and mouse may be wired or wireless. The mouse function of the control display touch screen, keyboard and external mouse may transition to additional displays or television. By controlling multiple displays the operator may multitask by watching a movie on one display, surf the internet on another, and arrange files on the other. Each display may be driven from an independent video card which could allow the operator to optimize the display resolution for each display. Custom software may allow the system to display specific programs and features to a specific display improving navigation efficiency.

Smart controlling software and hardware may auto route the audio signal to the entertainment system or television depending on the operating mode. When using speakers external to the television (e.g., center channel 416), the TV speaker volume is commonly minimized to reduce interaction with the external speakers. Playing both television and external speaker could drastically degrade the audio performance. The smart controls could sense if the system is active and determine whether to route the audio internally or external to the TV. If the entertainment system is turned on, it could auto switch the audio path and remote control back to the entertainment system. If the system is turned off, it could reroute the audio and remote control back to the TV. The system could transmit a signal to the remote control telling it to switch the path its' volume control to the entertainment system or TV, whichever is selected. The system could have the capability of remembering the volume control for each mode and recall when activated. User audio path routing setting may be setup during the initial system setup screen or any time afterward.

The entertainment system (e.g., any of 400, 500, 600, 800, 900, 1000, 1100, 1200 or 1700) is well suited to control multimedia interaction between external devices such as camcorders, digital cameras, mp3 players, phones or PDA. Data is imported or exported between the external device and the entertainment system. Each external device communicates with the main system through wired or wireless means such as Bluetooth, Infrared, USB, Fire wire, network (wired or wireless), optical media, HDMI, Infrared, serial, parallel, eSate, and solid state cards. If the attached device allows for it to be controlled remotely, the entertainment system may be setup to share the device through the many I/O ports.

If the entertainment system is connected to a wired (e.g., Ethernet) or wireless (e.g., 802.11) internet connection, software updates may be downloaded and installed. These updates may include visual functions, database updates, and bug fixes. During internal setup the operator may select auto update which may run a routine check and download updates automatically, or through a software setting cheek for updates manually. If the system is a not connected to the internet, the files may be downloaded to a remote computer and transferred to the entertainment system through one of its I/O ports.

A headphone port may be provided for a wired or wireless connection. When a multichannel source is being played through the system to the two channel headphone port, hardware or software simulated surround sound algorithm may be decoded and implemented. In the solid state option the algorithm may be programmed into the chip directly. With the software solution, the processing power of the CPU may provide the decoding. Both methods may be updated through the software updating process.

The center channel may connect through an automatic connection system. This system would eliminate the need for external wires running from the amplifier plate to the center channel. If the center channel implements a multi-speaker solution such as including the left and right, these may be connected to the automatic connection. This would further simplify the setup by eliminating physical wire connections to the external speakers and amplifier. The connector may protrude from the bottom of the center channel enclosure and mate with the corresponding connector on the main housing of the entertainment base.

Figure 18:
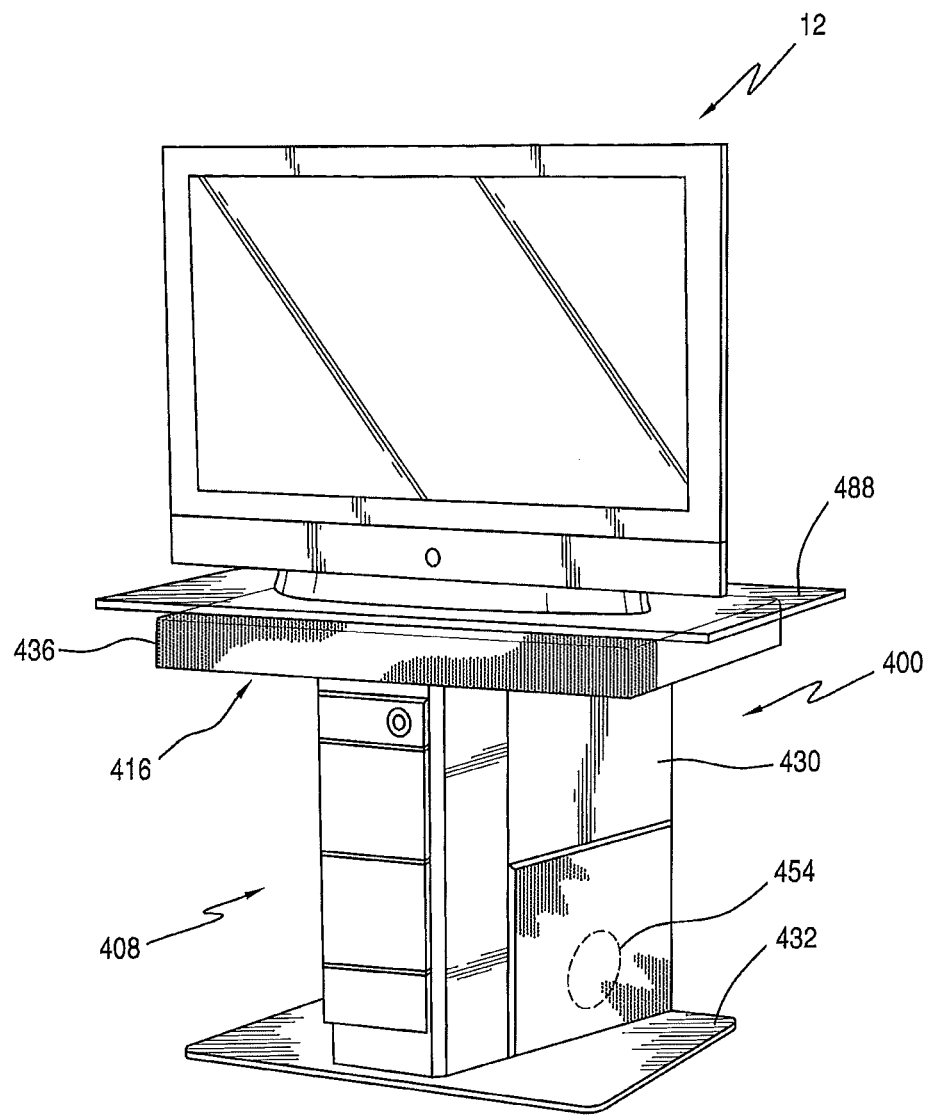
FIG. 18 illustrates another embodiment of the winged multi-channel loudspeaker enclosure and the system and support structure for integrating audio and video components in accordance with the present invention.

FIG. 18 illustrates a standard electronics configuration of the system, which is a new industrial design without a modular shelf under the center channel enclosure and with added glass support on top of the center channel enclosure to provide added support for the Television or video display 12. In the embodiment illustrated in FIG. 18, a system and support structure for integrating audio and video components 400 comprises a modular system 408 (sharing many of the characteristics of modular system 8 or FIG. 2) including a first enclosure 430 which is affixed to and supported by substantially planar base plate 432. First enclosure 430 preferably includes at least a first subwoofer 454 and supports a housing unit 436 which defines an enclosure for a center channel loudspeaker system 416. An upper support base 488 is preferably made of a planar segment of glass and supports the monitor or TV 12.

Taken together, the first enclosure 430 and the housing unit 436 comprise the modular base 408. First enclosure 430 is similar, in many respects, to the embodiments shown and described with respect to FIGS. 2 and 3. An electronics plate (not shown) serves to support various components inside the first enclosure 430 and to allow access to various controls and other components from outside of the first enclosure 430. First enclosure 430 may house first and second subwoofers (e.g., 454) housed in opposing side panels. By integrating the subwoofers into the first enclosure 430, space that would be wasted in a traditional television stand is used to provide a subwoofer enclosure. The need for a bulky, separate subwoofer unit is eliminated. Subwoofers are a source of low-frequency vibration that could potentially have a deleterious effect on components in the first enclosure 430. By mounting the subwoofers substantially in spatial opposition, the vibrations produced will be opposite in direction and substantially in phase. Therefore, the vibrations transmitted from the subwoofers to the first enclosure 430 substantially cancel each other. Acoustical ports may be used to reduce pressure within first enclosure 430, thus further reducing vibration to surrounding components. The acoustical ports may be mounted to first enclosure 430 on front or back walls.

Because the first enclosure 430 is designed to be both a stand as well as a speaker enclosure, the first enclosure 430 may be larger than prior art speakers but smaller than prior art home entertainment systems. The front panel provides portions of the home entertainment system 400 with which the user 4 may interact. These portions include a group of controls optionally including on-off switches, component selectors, volume controls and other controls. A sensor is preferably mounted in the front panel of the first enclosure 430 to receive signals from the remote control unit 6. The sensor interfaces with a remote control circuit. A number of components have portions mounted for access or display at the front panel. If desired, other, separate components may be interfaced to the home entertainment system 400. The front panel the rear panel or both may comprise further input means to receive further media signals for processing by components in the home entertainment system 400.

The center channel 416 may either be modular or unitary with the first enclosure 430. The upper support base 488 spans a top of the center channel enclosure and housing unit 436. It is generally desirable to have the center channel 416 situated so that the source of sound is closest to the video display 12.

In the illustration of FIG. 18, the upper stabilizing base 488 extends laterally or horizontally past either side of the housing unit 436. The upper stabilizing base 488 is fastened to the housing unit 436. Many different forms of fasteners or bonding could be used. The upper stabilizing base 488 may be removable in order to allow substitution of alternate upper stabilizing bases 488 to accommodate a wide range of television bases. Alternatively, a smaller television may be supported directly on the upper support surface under base 488.

The structure of the present embodiment permits the center channel enclosure to be wider than the first enclosure 430. This larger horizontal dimension allows for use of larger speakers than many prior art center channel units in an enclosure, and provides a larger than normal enclosure volume. The midbass driver (described with respect to FIGS. 8 and 9) may be mounted in portions of the center channel enclosure, which overhangs the first enclosure 430. Acoustical obstruction by the first enclosure 430 is avoided. This construction lends itself to match the "single speaker surround sound" format. The center channel 416 in the preferred form has a slim height and large width yielding a form which is generally regarded as aesthetically pleasing.

The internal components of the home entertainment system 400 are similar to those illustrated in FIGS. 5 and 6 or FIG. 16, with a plurality of modules in a single chassis or each module may optionally be housed in a separate chassis inside the first enclosure 430. In another form, the modules may comprise separate circuit boards, each circuit board being associated with a particular function, integrated in a multifunction unit and connected to a common power supply. The modules may easily be upgraded or replaced in the event a unit fails. This prevents replacing the entire unit, instead only the component needing upgrade or repair.

Figure 19:
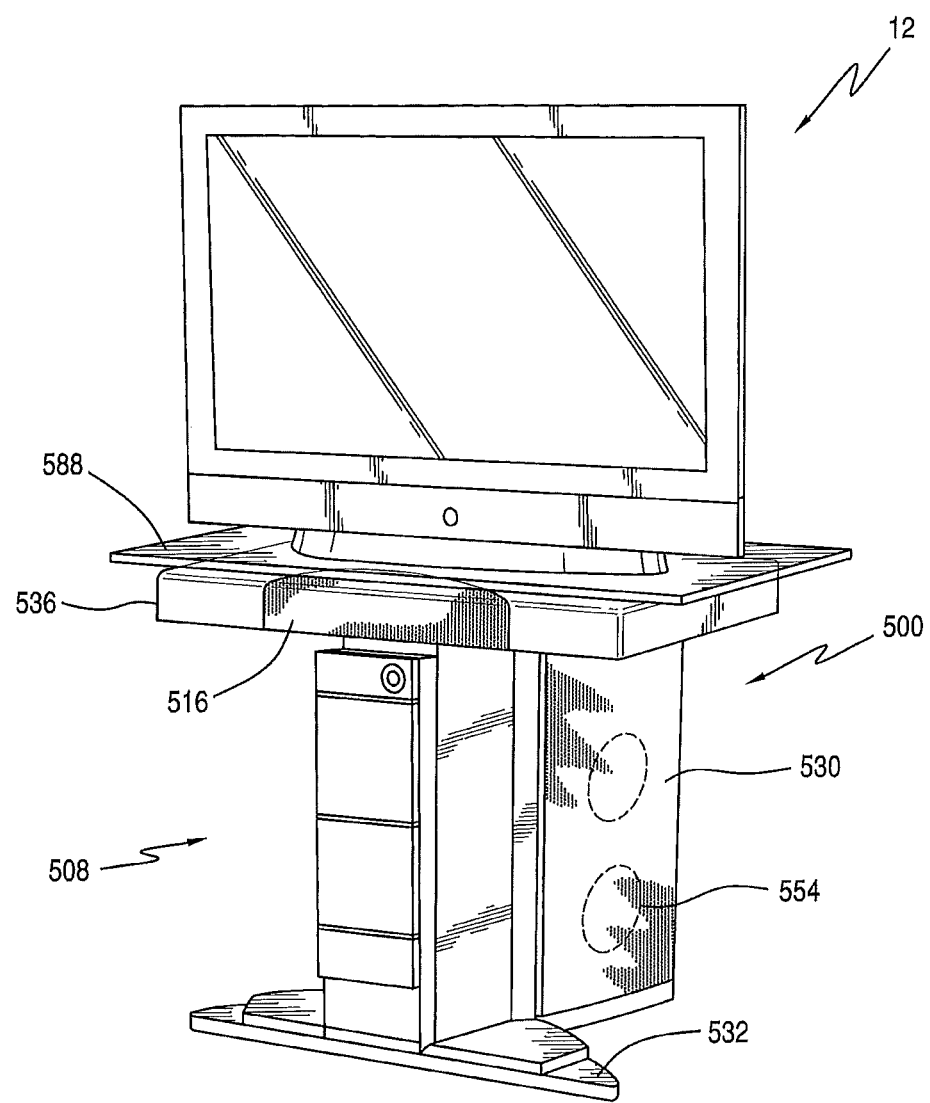
FIG. 19 illustrates a system and support structure for integrating audio and video components in accordance with another embodiment of the invention.

FIG. 19 illustrates another standard electronics configuration of the system, which is a new industrial design without a modular shelf under the center channel enclosure and with added glass support on top of the center channel enclosure to provide added support for the Television or video display 12. In the embodiment illustrated in FIG. 19, a system and support structure for integrating audio and video components 500 comprises a modular system 508 (sharing many of the characteristics of modular system 8 of FIG. 2) including a first enclosure 530 which is affixed to and supported by substantially planar base plate 532. First enclosure 430 preferably includes at least a first subwoofer 554 and supports a housing unit 536 which defines an enclosure for a center channel loudspeaker system 516. An upper support base 588 is preferably made of a planar segment of glass and supports the monitor or TV 12.

Taken together, the first enclosure 530 and the housing unit 536 comprise the modular base 508. First enclosure 530 is similar, in many respects, to the embodiments shown and described with respect to FIGS. 2 and 3. An electronics plate (not shown) serves to support various components inside the first enclosure 530 and to allow access to various controls and other components from outside of the first enclosure 530. First enclosure 530 may house first and second subwoofers (e.g., 554) housed in opposing side panels. By integrating the subwoofers into the first enclosure 530, space that would be wasted in a traditional television stand is used to provide a subwoofer enclosure. Acoustical ports may be used to reduce pressure within first enclosure 530, thus further reducing vibration to surrounding components. The acoustical ports may be mounted to first enclosure 530 on front or back walls.

Because the first enclosure 530 is designed to be both a stand as well as a speaker enclosure, the first enclosure 530 may be larger than prior art speakers but smaller than prior art home entertainment systems. The front panel provides portions of the home entertainment system 500 with which the user 4 may interact. These portions include a group of controls optionally including on-off switches, component selectors, volume controls and other controls. A sensor is preferably mounted in the front panel of the first enclosure 530 to receive signals from the remote control unit 6. The sensor interfaces with a remote control circuit. A number of components have portions mounted for access or display at the front panel. If desired, other, separate components may be interfaced to the home entertainment system 500. The front panel the rear panel or both may comprise further input means to receive further media signals for processing by components in the home entertainment system 500.

The center channel 516 may either be modular or unitary with the first enclosure 530. The upper support base 588 spans a top of the center channel enclosure and housing unit 536. It is generally desirable to have the center channel 516 situated so that the source of sound is closest to the video display 12.

In the illustration of FIG. 19, the upper stabilizing base 588 extends laterally or horizontally past either side of the housing unit 536. The structure of the present embodiment permits the center channel enclosure to be wider than the first enclosure 530. This larger horizontal dimension allows for use of larger speakers than many prior art center channel units in an enclosure, and provides a larger than normal enclosure volume. The midbass driver (e.g., as described with respect to FIGS. 8 and 9) may be mounted in portions of the center channel enclosure which overhangs the first enclosure 530. Acoustical obstruction by the first enclosure 530 is avoided.

The internal components of the home entertainment system 400 are similar to those illustrated in FIGS. 5 and 6 or FIG. 16, with a plurality of modules in a single chassis or each module may optionally be housed in a separate chassis inside the first enclosure 530. In another form, the modules may comprise separate circuit boards, each circuit board being associated with a particular function, integrated in a multifunction unit and connected to a common power supply. The modules may easily be upgraded or replaced in the event a unit fails. This prevents replacing the entire unit, instead only the component needing upgrade or repair.

Figure 20:
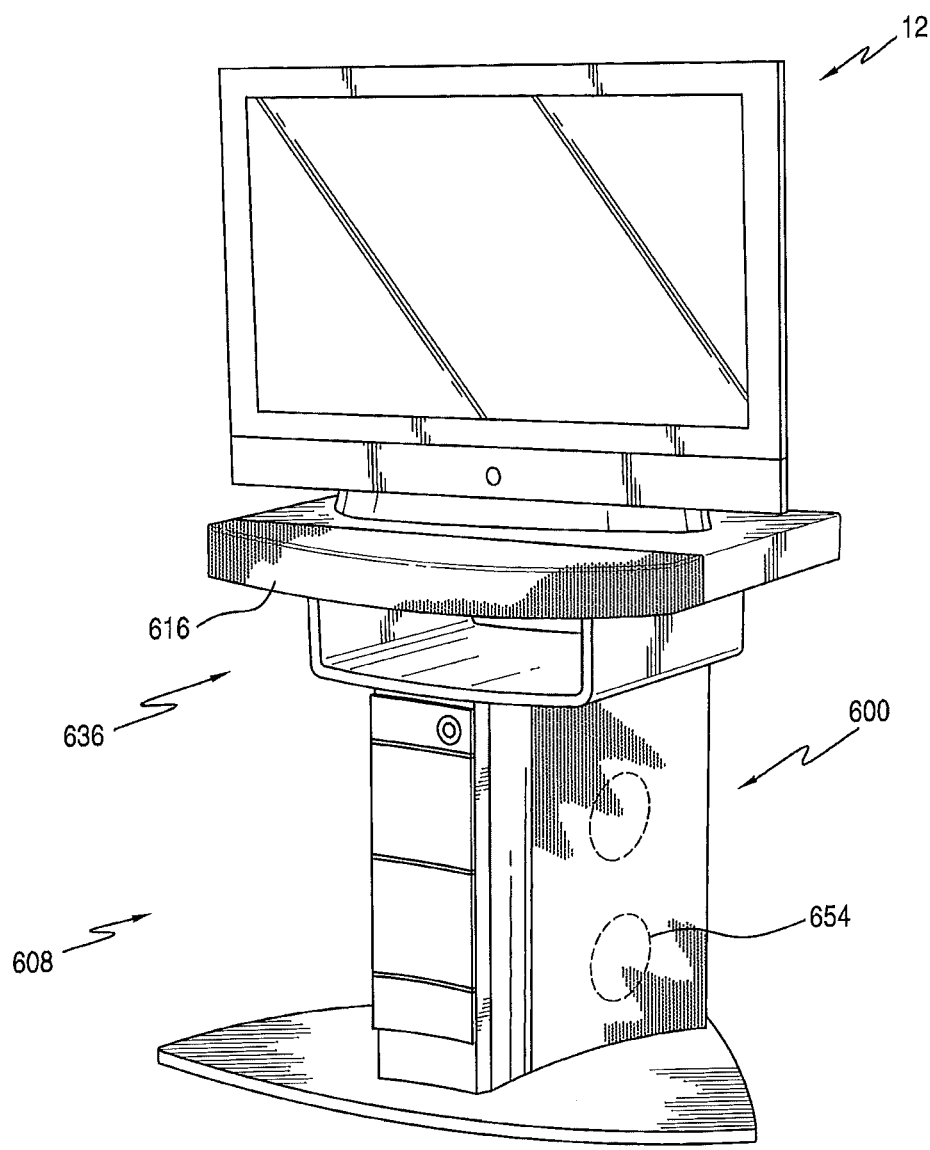
FIG. 20 illustrates another embodiment of the winged multi-channel loudspeaker enclosure and the system and support structure for integrating audio and video components in accordance with the present invention.

In the embodiment illustrated in FIG. 20, a system and support structure for integrating audio and video components 600 comprises a modular system 608 (also sharing many of the characteristics of modular system 8 of FIG. 2) including a first enclosure which is affixed to and supported by substantially planar base plate. The first enclosure preferably includes at least a first subwoofer 654 and supports a housing unit 636 which defines an enclosure for a center channel loudspeaker system 616. An upper support surface is preferably planar and supports the monitor or TV 12.

Taken together, the first enclosure and the housing unit 636 comprise the modular base 608. The first enclosure is similar, in many respects, to the embodiments shown and described with respect to FIGS. 2 and 3. An electronics plate (not shown) serves to support various components inside the first enclosure and to allow access to various controls and other components from outside of the first enclosure. The first enclosure may house first and second subwoofers (e.g., 654) housed in opposing side panels. By integrating the subwoofers into the first enclosure, space that would be wasted in a traditional television stand is used to provide a subwoofer enclosure. Acoustical ports may be used to reduce pressure within the first enclosure, thus further reducing vibration to surrounding components. The acoustical ports may be defined in the first enclosure's front or back walls.

Figure 21:
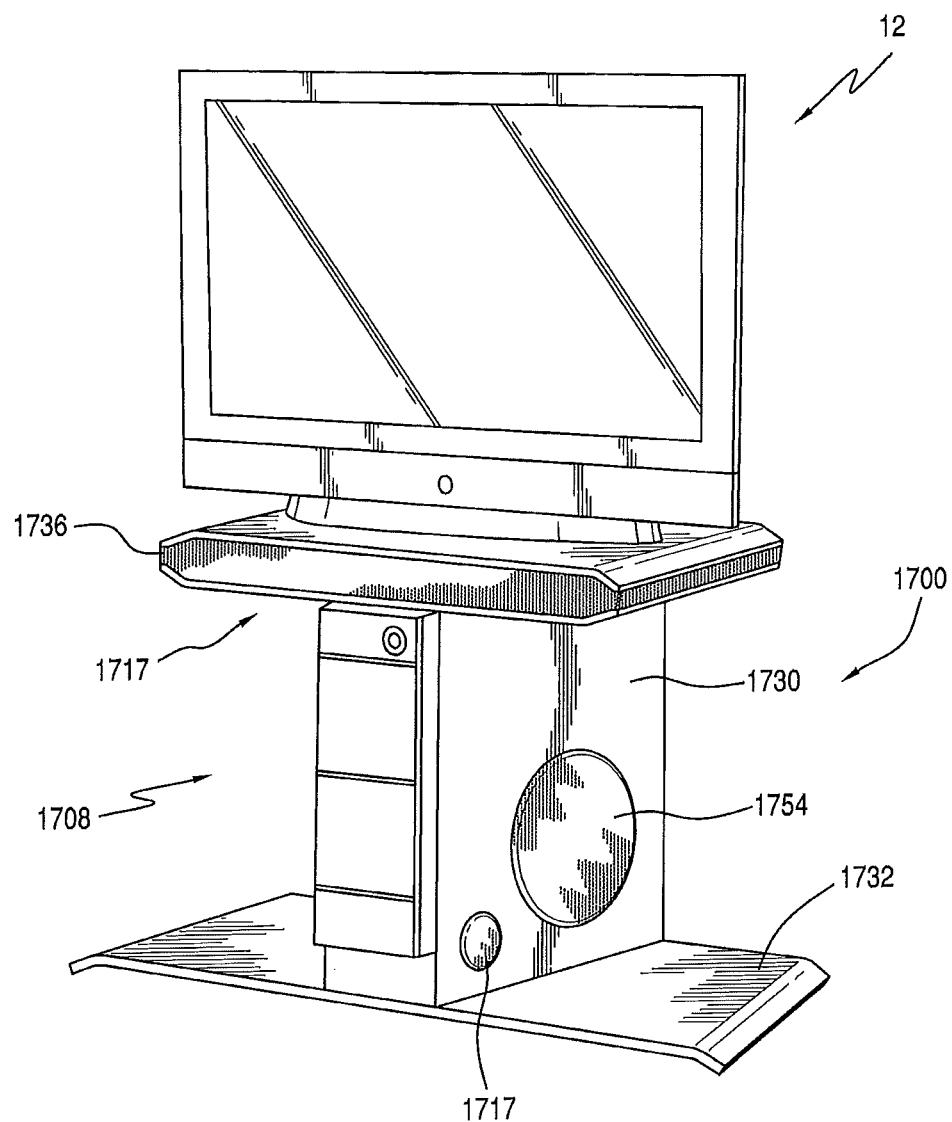
FIG. 21 illustrates another embodiment of the winged multi-channel loudspeaker enclosure and the system and support structure for integrating audio and video components in accordance with the present invention.

Turning now to the embodiment illustrated in FIG. 21, a system and support structure for integrating audio and video components 1700 comprises a modular system 1708 (also sharing many of the characteristics of modular system 8 of FIG. 2) including a first enclosure 1730 which is affixed to and supported by substantially planar base plate 1732. First enclosure 1730 preferably includes at least a first subwoofer 1754 and supports a housing unit 1736 which defines an enclosure for a center channel loudspeaker system 1716. An upper support surface is preferably planar and supports the monitor or TV 12.

Taken together, the first enclosure 1730 and the housing unit 1736 comprise the modular base 1708. First enclosure 1730 is similar, in many respects, to the embodiments shown and described with respect to FIGS. 2 and 3. An electronics plate (not shown) serves to support various components inside the first enclosure 1730 and to allow access to various controls and other components from outside of the first enclosure 1730. First enclosure 1730 may house first and second subwoofers (e.g., 1754) housed in opposing side panels. By integrating the subwoofers into the first enclosure 1730, space that would be wasted in a traditional television stand is used to provide a subwoofer enclosure. Acoustical ports 1717 may be used to reduce pressure within first enclosure 1730, thus further reducing vibration to surrounding components. The acoustical ports 1717 may be incorporated in first enclosure 1730's side walls or the front or back walls.

Figure 22:
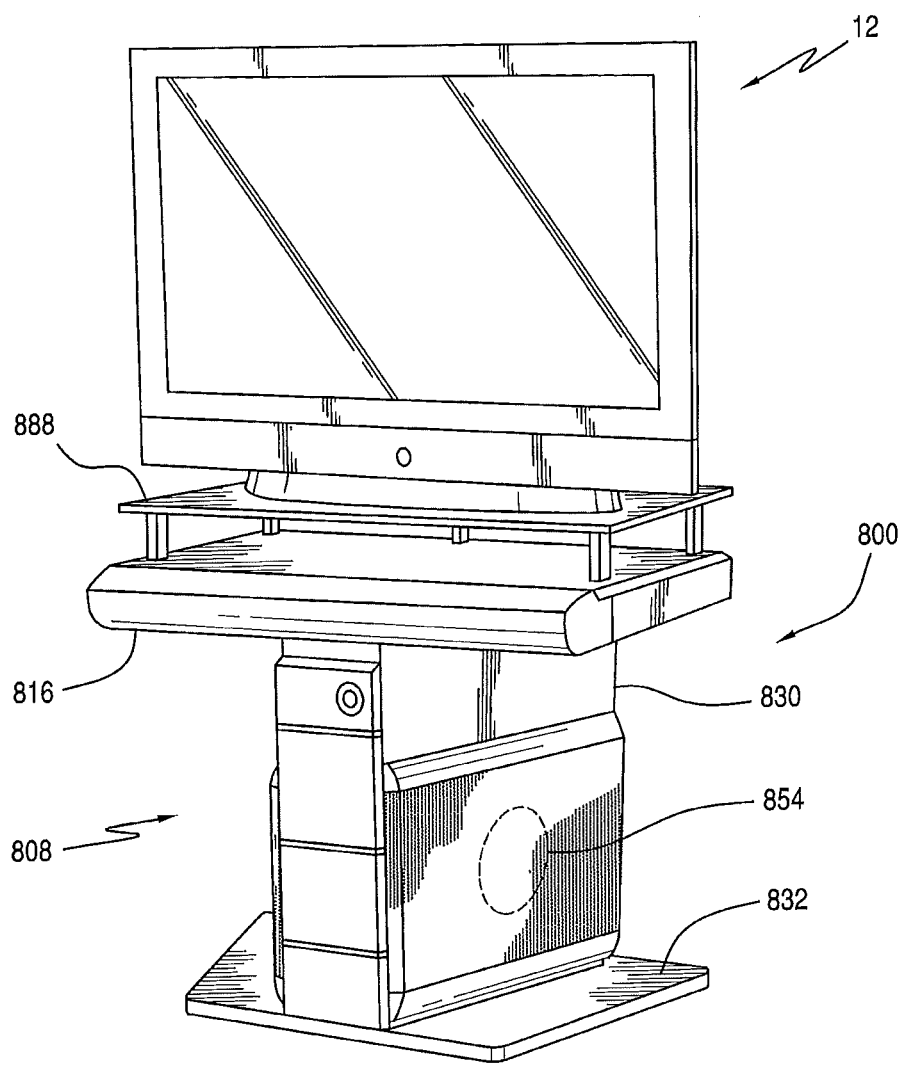
FIG. 22 illustrates another embodiment of the winged multi-channel loudspeaker enclosure and the system and support structure for integrating audio and video components in accordance with the present invention.

FIG. 22 illustrates a standard electronics configuration of the system, which is a new industrial design with an added glass support shelf 888 on top of the center channel enclosure to provide added support for the Television or video display 12. In the embodiment illustrated in FIG. 22, a system and support structure for integrating audio and video components 800 comprises a modular system 808 (also sharing many of the characteristics of modular system 8 of FIG. 2) including a first enclosure 830 which is affixed to and supported by substantially planar base plate 832. First enclosure 830 preferably includes at least a first subwoofer 854 and supports a housing unit 836 which defines an enclosure for a center channel loudspeaker system 816. An upper support surface is preferably planar and supports the monitor or TV 12.

Taken together, the first enclosure 830 and the housing unit 836 comprise the modular base 808. First enclosure 830 is similar, in many respects, to the embodiments shown and described with respect to FIGS. 2, 3 and 11-14. An electronics plate (not shown) serves to support various components inside the first enclosure 830 and to allow access to various controls and other components from outside of the first enclosure 830. First enclosure 830 may house first and second subwoofers (e.g., 854) housed in opposing side panels. By integrating the subwoofers into the first enclosure 830, space that would be wasted in a traditional television stand is used to provide a subwoofer enclosure. Acoustical ports may be used to reduce pressure within first enclosure 830, thus further reducing vibration to surrounding components. The acoustical ports may be mounted to first enclosure 830 on front or back walls.

Figure 23:
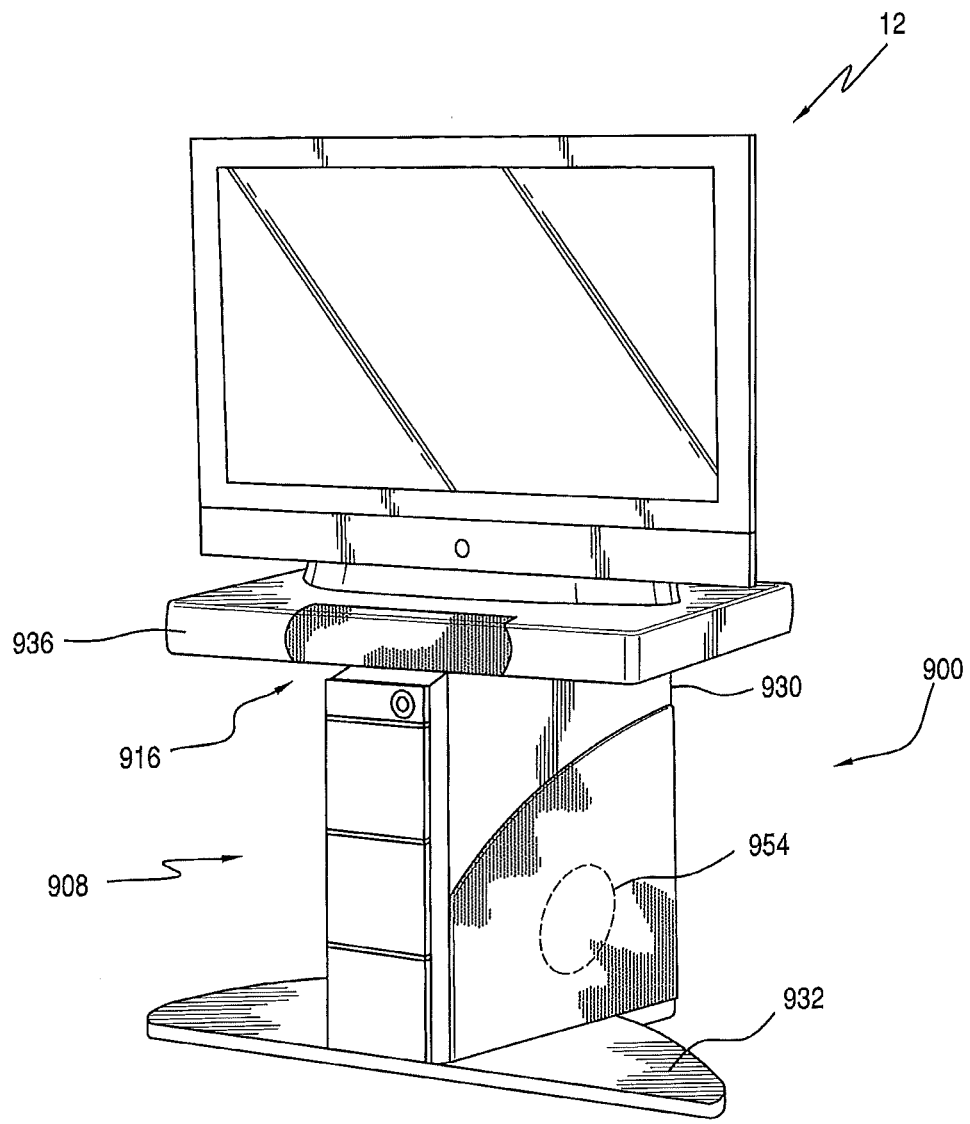
FIG. 23 illustrates a system and support structure for integrating audio and video components in accordance with another embodiment of the invention.

FIG. 23 illustrates a standard electronics configuration of the system, which is a new industrial design without a modular shelf under the center channel enclosure, which provides a support surface on top of the center channel enclosure to support for the Television or video display 12. In the embodiment illustrated in FIG. 23, a system and support structure for integrating audio and video components 900 comprises a modular system 908 (also sharing many of the characteristics of modular system 8 of FIG. 2) including a first enclosure 930 which is affixed to and supported by substantially planar base plate 932. First enclosure 930 preferably includes at least a first subwoofer 954 and supports a housing unit 936 which defines an enclosure for a center channel loudspeaker system 916. An upper support surface is preferably planar and supports the monitor or TV 12.

Taken together, the first enclosure 930 and the housing unit 936 comprise the modular base 908. First enclosure 930 is similar, in many respects, to the embodiments shown and described with respect to FIGS. 2, 3 and 12-14. An electronics plate (not shown) serves to support various components inside the first enclosure 930 and to allow access to various controls and other components from outside of the first enclosure 930. First enclosure 930 may house first and second subwoofers (e.g., 954) housed in opposing side panels. By integrating the subwoofers into the first enclosure 930, space that would be wasted in a traditional television stand is used to provide a subwoofer enclosure. Acoustical ports may be used to reduce pressure within first enclosure 930, thus further reducing vibration to surrounding components. The acoustical ports may be mounted to first enclosure 930 on front or back walls.

Figure 24:
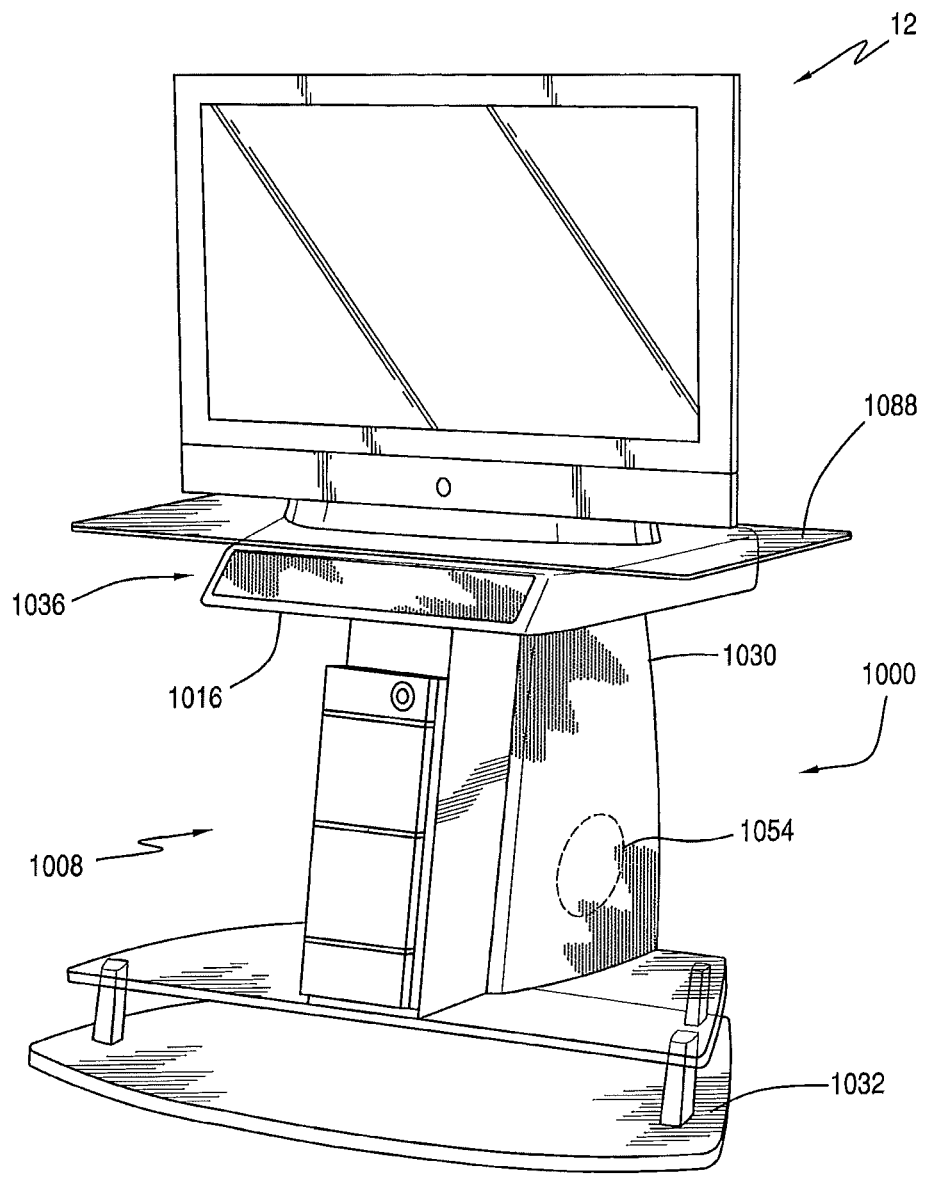
FIG. 24 illustrates another system and support structure for integrating audio and video components in accordance with an embodiment of the invention.

FIG. 24 illustrates a standard electronics configuration of the system, which is a new industrial design without a modular shelf under the center channel enclosure and with an added glass support on top of the center channel enclosure to provide added support for the Television or video display 12 and an added lower shelf over base 1032 to define a storage volume therebetween. In the embodiment illustrated in FIG. 24, a system and support structure for integrating audio and video components 1000 comprises a modular system 1008 (also sharing many of the characteristics of modular system 8 of FIG. 2) including a first enclosure 1030 which is affixed to and supported by substantially planar base plate 1032. First enclosure 1030 preferably includes at least a first subwoofer 1054 and supports a housing unit 1036 which defines an enclosure for a center channel loudspeaker system 1016. An upper support surface is preferably planar and supports the monitor or TV 12.

Taken together, the first enclosure 1030 and the housing unit 1036 comprise the modular base 1008. First enclosure 830 is similar, in many respects, to the embodiments shown and described with respect to FIGS. 2, 3, 12, 13 and 15. An electronics plate (not shown) serves to support various components inside the first enclosure 1030 and to allow access to various controls and other components from outside of the first enclosure 1030. First enclosure 1030 may house first and second subwoofers (e.g., 53) housed in opposing side panels. By integrating the subwoofers into the first enclosure 1030, space that would be wasted in a traditional television stand is used to provide a subwoofer enclosure. Acoustical ports may be used to reduce pressure within first enclosure 1030, thus further reducing vibration to surrounding components. The acoustical ports may be mounted to first enclosure 1030 on front or back walls.

Figure 25:
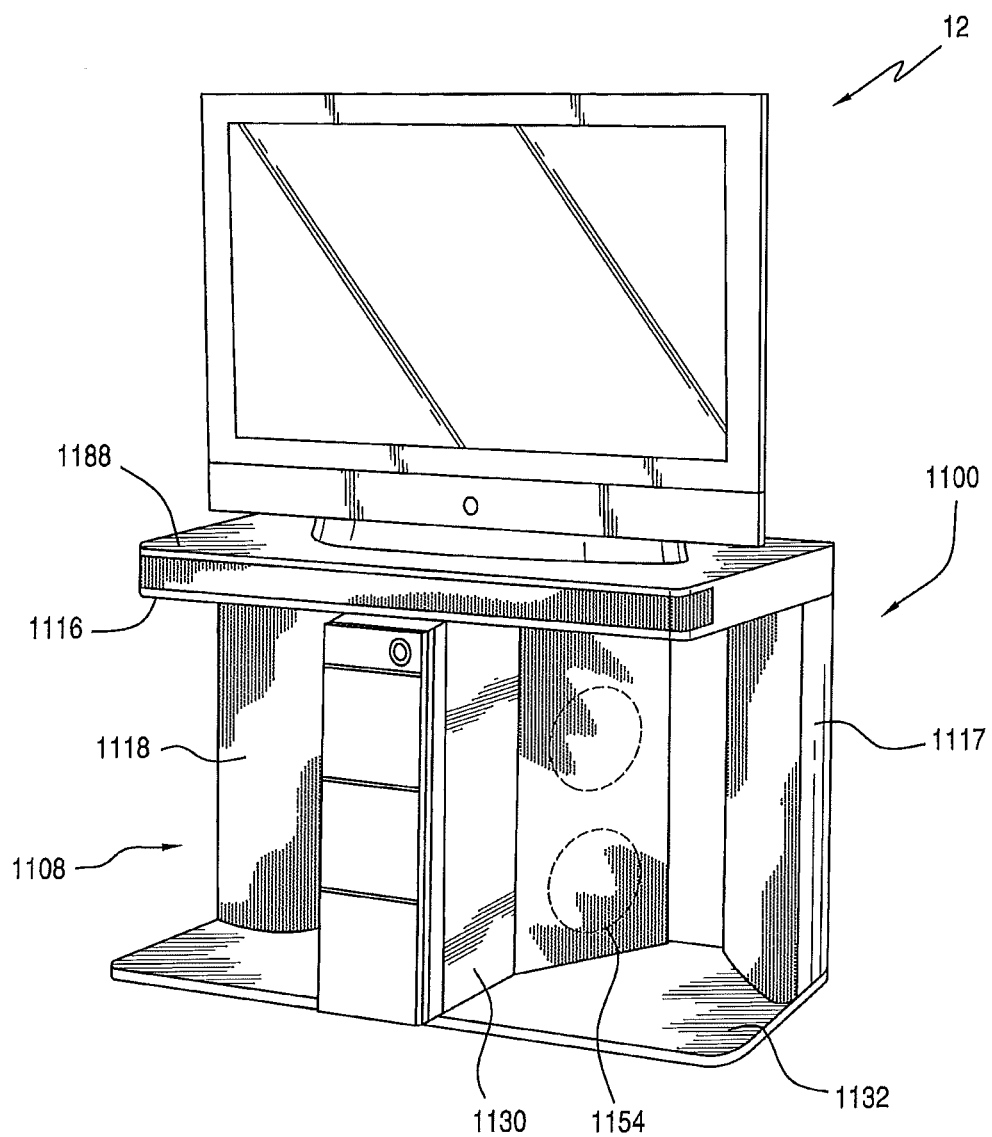
FIG. 25 illustrates another embodiment of the winged multi-channel loudspeaker enclosure and the system and support structure for integrating audio and video components in accordance with the present invention.

FIG. 25 illustrates a standard configuration of the system, which is a new industrial design without a modular shelf under the center channel enclosure and with added left and right channel speaker enclosures projecting upwardly to support the center channel enclosure which provides support for the Television or video display 12. In the embodiment illustrated in FIG. 25, a system and support structure for integrating audio and video components 1100 comprises a modular system 1108 (also sharing many of the characteristics of modular system 8 of FIG. 2) including a first enclosure 1130 resting upon a substantially planar base 1188. First enclosure 1130 preferably includes at least a first subwoofer 1154 and supports a housing unit which defines an enclosure for a center channel loudspeaker system 1116. An upper support surface is preferably planar and supports the monitor or TV 12.

Taken together, the first enclosure 1130 and the housing unit comprise the modular base 1108. First enclosure 1130 is similar, in many respects, to the embodiments shown and described with respect to FIGS. 2, 3 and 10. A left channel loudspeaker 1118 is configured with a tall and narrow enclosure forming a left side columnar support which opposes the symmetrically aligned right channel loudspeaker 1117 which is also configured with a tall and narrow enclosure forming a right side columnar support, such that each provides a load bearing column to support the opposing laterally projecting left and right sides of upper support base 1188. An electronics plate (not shown) serves to support various components inside the first enclosure 1130 and to allow access to various controls and other components from outside of the first enclosure 1130. First enclosure 1130 may house first and second subwoofers (e.g., 1154) housed in opposing side panels. By integrating the subwoofers into the first enclosure 1130, space that would be wasted in a traditional television stand is used to provide a subwoofer enclosure. Acoustical ports may be used to reduce pressure within first enclosure 1130, thus further reducing vibration to surrounding components. The acoustical ports may be mounted to first enclosure 1130 on front or back walls.

Figure 26:
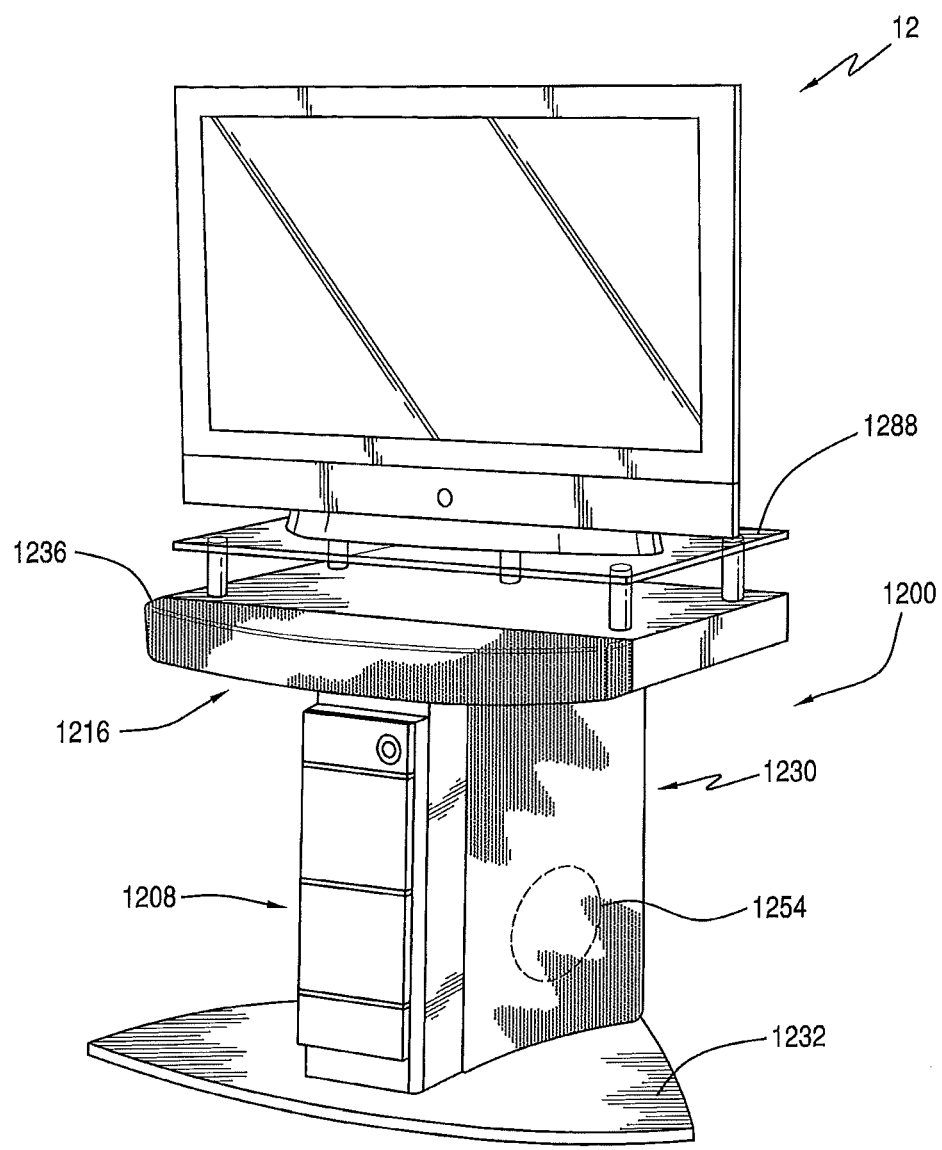
FIG. 26 illustrates another embodiment of the winged multi-channel loudspeaker enclosure and the system and support structure for integrating audio and video components in accordance with the present invention.

FIG. 26 illustrates a standard configuration of the system, which is a new industrial design with a modular shelf over the center channel enclosure to provide added support for the Television or video display 12. In the embodiment illustrated in FIG. 26, a system and support structure for integrating audio and video components 1200 comprises a modular system 1208 (also sharing many of the characteristics of modular system 8 of FIG. 2) including a first enclosure 1230 which is affixed to and supported by substantially planar base plate 1232. First enclosure 1230 preferably includes at least a first subwoofer 1254 and supports a housing unit 1236 which defines an enclosure for a center channel loudspeaker system 1216. An upper support surface is preferably planar and supports the monitor or TV 12.

Taken together, the first enclosure 1230 and the housing unit 1236 comprise the modular base 1208. First enclosure 1230 is similar, in many respects, to the embodiments shown and described with respect to FIGS. 2, 3 and 11-17. An electronics plate (not shown) serves to support various components inside the first enclosure 1230 and to allow access to various controls and other components from outside of the first enclosure 1230. First enclosure 1230 may house first and second subwoofers (e.g., 1254) housed in opposing side panels. By integrating the subwoofers into the first enclosure 1230, space that would be wasted in a traditional television stand is used to provide a subwoofer enclosure. Acoustical ports may be used to reduce pressure within first enclosure 1230, thus further reducing vibration to surrounding components. The acoustical ports may be mounted to first enclosure 1230 on front or back walls.

It will be appreciated by those having skill in the art that the support structure of the present invention makes a new and more convenient media integration method available. The method for integrating and supporting components in a unitary, one-piece computer controlled integrated entertainment system comprises: providing a support structure (e.g., 400 or 1100) for integrating audio and video components (e.g., as shown in FIG. 16) and including a first media source (e.g., 705), an amplifier 150, a decoder and a power supply 202 configured to provide power for said components; providing said support structure with an integral, modular base having a first enclosure (e.g., 430) configured to receive and support said components; said modular base first enclosure having a front wall segment having a first selected width and a base plate (e.g., 432), said modular base projecting upwardly from said base plate; wherein said base plate projects laterally to define a second width that is substantially greater than said modular base enclosure's first selected width; and said support structure further including an upper support base (e.g., 488) which projects laterally to define a third width that is (i) substantially greater than said modular base enclosure's first selected width and (ii) selected to provide support for a video or television display 12; said support structure further defining an enclosure dimensioned to carry at least one integrated speaker (e.g., center channel 416 and/or subwoofer 454); and configuring said support structure to carry a CPU 709 configured and programmed to control said media source, said amplifier, said decoder and said integrated speaker, and (d) programming CPU 709 to control the media source, amplifier, decoder, integrated speaker and display in response to user commands.

Having described preferred embodiments of a new and improved apparatus and method, it is believed that other modifications, variations and changes will be suggested to those skilled in the art in view of the teachings set forth herein. It is therefore to be understood that all such variations, modifications and changes are believed to fall within the scope of the present invention as set forth in the following claims.

I claim:

1. A multi-channel loudspeaker system with a winged enclosure, comprising:
   (a) a first pedestal enclosure having a front baffle or wall segment with a first selected width, said pedestal enclosure projecting upwardly from a base plate; wherein said base plate projects laterally to define a second width that is substantially greater than said first pedestal enclosure's first selected width;
   (b) an elongated second multi-compartment winged enclosure and loudspeaker system with left and right side portions that project laterally to define a continuous upper surface and a winged enclosure front baffle having a third width that is (i) substantially greater than said first pedestal enclosure's first selected width and (ii) configured with the upper surface dimensioned to provide support for a video or television display;
   (c) wherein said winged, multi-compartment enclosure has a plurality of walls including an uppermost wall which defines the continuous upper surface extending laterally beyond the first pedestal enclosure's left and right side walls to define laterally projecting left and right side wings terminating laterally in opposing winged enclosure left and right side walls, each extending from the winged enclosure front baffle or wall which opposes a winged enclosure rear wall and the uppermost wall opposes the lower wall, including laterally projecting left and right side winged enclosure lower wall segments, to define an enclosed volume which includes a plurality of sub-enclosures or compartments therein;
   (d) wherein said winged, multi-compartment enclosure includes at least
      (i) a first center channel loudspeaker driver mounted in said front wall and aligned to project sound toward a user's position,
      (ii) a first left channel loudspeaker driver mounted in said front wall, to the left of said center channel loudspeaker driver and aligned to project sound toward a user's position,
      (iii) a first right channel loudspeaker driver mounted in said front wall, to the right of said center channel loudspeaker driver and aligned to project sound toward a user's position,
      (iv) a left channel mid-bass driver mounted in said winged enclosure left side lower wall segment, to the left of said center channel loudspeaker driver and aligned to project sound downwardly from a position that is laterally offset to the left from said first pedestal's left side wall, and
      (iv) a right channel mid-bass driver mounted in said winged enclosure right side lower wall segment, to the right of said center channel loudspeaker driver and aligned to project sound downwardly from a position that is laterally offset to the right from said first pedestal's right side wall.

2. The multi-channel loudspeaker system and enclosure of claim 1, wherein said upper support surface defines a platform with a lateral extent or width of 36 to 60 inches.

3. The multi-channel loudspeaker system and enclosure of claim 1, wherein said winged enclosure left side lower wall segment provides a virtually invisible location for down-firing left side mid-bass driver.

4. The multi-channel loudspeaker system and enclosure of claim 3, wherein said center channel speaker, said left channel speaker and said right channel speaker are configured and driven to provide superior acoustic summation with the down-firing mid-bass drivers.

5. The multi-channel loudspeaker system and enclosure of claim 3, further including at least one subwoofer driver placed in a sidewall of said pedestal enclosure.

6. The multi-channel loudspeaker system and enclosure of claim 4, wherein said left channel side down-firing mid-bass driver is mounted within a left wing sub-enclosure or compartment volume.

7. The multi-channel loudspeaker system and enclosure of claim 6, further including a center channel mid-bass driver mounted in said lower wall segment, proximate to and beneath said center channel loudspeaker driver and aligned to project sound downwardly from a position that is in front of said pedestal's front baffle.

8. The multi-channel loudspeaker system and enclosure of claim 1, further comprising a support structure for integrating audio and video components including:
   (a) a plurality of entertainment component modules including a first media source, an amplifier and an audio or video program signal decoder;
   (b) a power supply configured to provide power for said entertainment component modules;
   (c) a modular base enclosure within said pedestal having an interior and an electronics plate support configured to receive and support said entertainment component modules; and
   (d) a heat exchange apparatus configured to dissipate heat from said modular base enclosure's modules.

9. The multi-channel loudspeaker system and enclosure of claim 8, wherein said modular base enclosure comprises a front wall opposing a back wall and a left side wall opposing a right side wall; wherein said electronics plate support and said heat exchange apparatus are supported on said modular base enclosure's back wall.

10. The multi-channel loudspeaker system and enclosure of claim 1, further comprising a computer controlled integrated entertainment system configured as an all in one media center and programmed to provide facilities for downloading, sharing, editing and playback of audio or video program materials, including:
    (a) a support structure incorporated within said pedestal enclosure for integrating audio and video components and including a first media source, an amplifier, a decoder and a power supply configured to provide power for said components;
    (b) said support structure further comprising a modular base having a first enclosure configured to receive and support said components with an electronics plate support configured to receive and support said entertainment component modules;
    (c) wherein said support structure further comprises a CPU configured and programmed to control said media source, said amplifier, said decoder and said integrated speaker.

11. The multi-channel loudspeaker system and enclosure of claim 10, further comprising a built in interactive touch screen display configured to receive image data signals from said CPU.

12. The multi-channel loudspeaker system and enclosure of claim 11, further comprising a wired or wireless pointing device, mouse, keyboard or mobile device, for use when navigating said CPU's pre-programmed software controls to operate the system.

13. The multi-channel loudspeaker system and enclosure of claim 12, wherein said media center is configured to transfer audio or video program files one or more standardized protocols in analog or digital domains.

14. The multi-channel loudspeaker system and enclosure of claim 13, wherein said analog and digital content may be imported or streamed over communications channels using standardized protocols selected from the group of Bluetooth® signal transmission, Infrared signal transmission, USB® signal transmission, Fire Wire® signal transmission, 802.11 wireless signal transmission, Ethernet® signal transmission, optical media or solid state cards.

15. The multi-channel loudspeaker system and enclosure of claim 14, wherein said analog and digital content may be imported and exported on transportable optical media or solid state memory cards.

16. The multi-channel loudspeaker system and enclosure of claim 10, wherein said entertainment system may be configured by the user as a standalone system.

17. The multi-channel loudspeaker system and enclosure of claim 10, wherein said entertainment system may be configured by the user as a file sharing hub for multiple local or remote components.

18. The multi-channel loudspeaker system and enclosure of claim 17, wherein said entertainment system, when configured by the user as a file sharing hub for multiple local or remote components, is pre-programmed to serve as either a master controller or as a media center configured to be controlled remotely.

19. A multi-channel loudspeaker system with a winged enclosure, comprising:
  (a) a pedestal having a first selected width, said pedestal having left and right sidewalls projecting upwardly from a base plate; wherein said base plate projects laterally to define a second width that is substantially greater than said pedestal's first selected width;
  (b) an elongated multi-compartment winged enclosure and loudspeaker system with left and right side portions that project laterally to define a continuous upper surface and front baffle having a third width that is (i) substantially greater than said pedestal's first selected width and (ii) configured with the upper surface dimensioned to provide support for a video or television display;
  (c) wherein said elongated winged enclosure has a plurality of walls including an uppermost wall which defines the continuous upper surface extending laterally beyond the pedestal's left and right side walls to define laterally projecting left and right side wings, each including laterally projecting left and right side winged enclosure lower wall segments;
  (d) wherein said winged enclosure includes at least
    (i) a left channel driver mounted in said winged enclosure left side lower wall segment, aligned to project sound downwardly from a position that is laterally offset to the left from said pedestal's left side wall, and
    (iv) a right channel driver mounted in said winged enclosure right side lower wall segment, aligned to project sound downwardly from a position that is laterally offset to the right from said pedestal's right side wall.

20. The multi-channel loudspeaker system and enclosure of claim 19, wherein said winged enclosure left side lower wall segment provides a virtually invisible location for a down-firing left side mid-bass driver.

* * * * *